United States Patent
Lai et al.

(10) Patent No.: US 12,474,415 B2
(45) Date of Patent: Nov. 18, 2025

(54) SHORT CIRCUIT DETECTION APPARATUS AND CONTROL METHOD FOR SWITCHED CAPACITOR CONVERTER

(71) Applicant: Halo Microelectronics International, Campbell, CA (US)

(72) Inventors: Suming Lai, San Diego, CA (US); Kenneth Chung-Yin Kwok, Irvine, CA (US); Kien Chan Vi, Palo Alto, CA (US); Anan Xiang, San Diego, CA (US); Songnan Yang, Frisco, TX (US)

(73) Assignee: Halo Microelectronics International, Campbell, CA (US)

( * ) Notice: Subject to any disclaimer, the term of this patent is extended or adjusted under 35 U.S.C. 154(b) by 165 days.

(21) Appl. No.: 18/229,991

(22) Filed: Aug. 3, 2023

(65) Prior Publication Data
US 2023/0375641 A1    Nov. 23, 2023

Related U.S. Application Data

(63) Continuation-in-part of application No. 17/484,269, filed on Sep. 24, 2021, now Pat. No. 11,740,300.
(Continued)

(51) Int. Cl.
*G01R 31/52*    (2020.01)
*G01R 31/40*    (2020.01)
(Continued)

(52) U.S. Cl.
CPC .......... *G01R 31/52* (2020.01); *G01R 31/40* (2013.01); *H02J 7/007* (2013.01); *H02M 3/07* (2013.01); *H02J 2207/20* (2020.01)

(58) Field of Classification Search
CPC ......... G01R 31/52; G01R 31/40; H02J 7/007; H02J 2207/20; H02M 3/07
See application file for complete search history.

(56) References Cited

U.S. PATENT DOCUMENTS

| 5,187,631 A | 2/1993 | Baylac et al. |
| 2010/0181946 A1* | 7/2010 | Ogasawara ............ H02M 1/32 318/139 |

(Continued)

FOREIGN PATENT DOCUMENTS

| CN | 110474550 A | 11/2019 |
| DE | 19813964 A1 | 8/1999 |

(Continued)

OTHER PUBLICATIONS

First Office Action received in Chinese Application No. 202111249195.X, mailed Apr. 24, 2025.

*Primary Examiner* — Lisa M Caputo
*Assistant Examiner* — Sharah Zaab
(74) *Attorney, Agent, or Firm* — AP3 Law Firm PLLC

(57) ABSTRACT

A method includes connecting an output of a switched capacitor converter to a battery, the switched capacitor converter comprising a first switch, a second switch, a third switch and an upper circuit connected in series, and a flying capacitor connected between a common node of the first switch and the second switch, and a common node of the third switch and the upper circuit, in a first short circuit testing step, determining whether the third switch is shorted by comparing a voltage on the common node of the third switch and the upper circuit with a first predetermined voltage reference, and in a second short circuit testing step, determining whether the first switch and the second switch are shorted by comparing a voltage on the common node of the first switch and the second switch with a second predetermined voltage reference and a third predetermined voltage reference, respectively.

20 Claims, 17 Drawing Sheets

Related U.S. Application Data

(60) Provisional application No. 63/106,669, filed on Oct. 28, 2020.

(51) Int. Cl.
*H02J 7/00* (2006.01)
*H02M 3/07* (2006.01)

(56) References Cited

U.S. PATENT DOCUMENTS

| | | | |
|---|---|---|---|
| 2017/0338735 A1* | 11/2017 | Alarcon-Cot | ........... H02M 3/07 |
| 2018/0123457 A1 | 5/2018 | Yaguchi et al. | |
| 2018/0278045 A1 | 9/2018 | Watanabe et al. | |

FOREIGN PATENT DOCUMENTS

| | | | |
|---|---|---|---|
| JP | 2011259548 A | 12/2011 |
| JP | 2017143700 A | 8/2017 |

\* cited by examiner

SHORT CIRCUIT DETECTION APPARATUS AND CONTROL METHOD FOR SWITCHED CAPACITOR CONVERTER

RELATED APPLICATIONS

This application is a continuation-in-part of U.S. patent application Ser. No. 17/484,269, filed Sep. 24, 2021, and entitled "Short Circuit Detection Apparatus and Control Method for Switched Capacitor Converter," which claims the benefit of U.S. Provisional Application No. 63/106,669, filed on Oct. 28, 2020, entitled "Short Circuit Detection Apparatus and Control Method for Switched Capacitor Converter," all of which are incorporated herein by reference.

TECHNICAL FIELD

The present invention relates to a short circuit detection apparatus, and, in particular embodiments, to a short circuit detection apparatus for a switched capacitor converter.

BACKGROUND

As technologies further advance, a variety of portable devices, such as mobile phones, tablet PCs, digital cameras, MP3 players and/or the like, have become popular. Each portable device may employ at least one rechargeable battery cell.

As power consumption has become more important, there may be a need for reducing the length of time to charge the battery. Fast charging has emerged as a veritable solution to satisfy the ever changing demand from consumers. In a fast charging system, a switched capacitor converter is employed to deliver high current to the battery while keeping the input current (e.g., USB cable current) low. The switched capacitor converter has various advantages such as monolithic integration of the converter without external inductors, high power conversion efficiency and the like. The switched capacitor converter is capable of achieving a safe and quick charging of large-capacity batteries.

In the fast charging system, short circuit detection tests are essential to ensure the safety and long-term reliability of the battery and battery charging systems. The short circuit detection tests are particularly important for the switched capacitor converter because the power switches of the switched capacitor converter are typically of ultra-low resistance. The existing short circuit detection tests only cover the short circuit across the flying capacitor of the switched capacitor converter. It would be desirable to have a simple and reliable short circuit detection apparatus and method for covering the short circuit tests of all switching elements in the switched capacitor converter.

SUMMARY

These and other problems are generally solved or circumvented, and technical advantages are generally achieved, by preferred embodiments of the present disclosure which provide a short circuit detection apparatus and method for a switched capacitor converter.

In accordance with an embodiment, a method comprises connecting an input voltage bus of a switched capacitor converter to a power source through a load switch, the switched capacitor converter comprising a first switch, a second switch, a third switch and a fourth switch connected in series between the input voltage bus and ground, and a flying capacitor connected between a common node of the first switch and the second switch, and a common node of the third switch and the fourth switch, in a first short circuit testing step, determining whether the load switch or the second switch is shorted by comparing a voltage on the input voltage bus with a first predetermined voltage reference, after passing the first short circuit testing step, in a second short circuit testing step, determining whether the first switch or the fourth switch is shorted by comparing a voltage on the common node of the third switch and the fourth switch with a second predetermined voltage reference, and after passing the second short circuit testing step, in a third short circuit testing step, determining whether the third switch is shorted by comparing the voltage on the common node of the third switch and the fourth switch with a third predetermined voltage reference.

In accordance with another embodiment, a method for detecting failed components in a switched capacitor converter comprising four switches and a flying capacitor comprises in a first step, comparing a voltage on an input voltage bus of the switched capacitor converter with a first predetermined voltage reference to determine whether a load switch or a second switch of the switched capacitor converter is shorted, wherein the load switch is coupled between a power source and the input voltage bus, after passing the first step, in a second step, comparing a voltage on a common node of a third switch and a fourth switch with a second predetermined voltage reference to determine whether a first switch or a fourth switch is shorted, after passing the second step, in a third step, comparing the voltage on the common node of the third switch and the fourth switch with a third predetermined voltage reference determining whether a third switch is shorted, and after passing the third step, turning on the load switch to establish the voltage on the input voltage bus, turning on the second switch, and in a fourth step, comparing the voltage on the common node of the third switch and the fourth switch with a fourth predetermined voltage reference to determine whether the flying capacitor is shorted.

In accordance with yet another embodiment, a system comprises a switched capacitor converter comprising a first switch, a second switch, a third switch and a fourth switch connected in series between an input voltage bus and ground, and a flying capacitor connected between a common node of the first switch and the second switch, and a common node of the third switch and the fourth switch, wherein the input voltage bus is configured to be coupled to a power source through a load switch, and a short circuit detection apparatus comprising a first dedicated circuit and a second dedicated circuit, wherein the first dedicated circuit comprises a current reference and a first control switch connected in series between a common node of the second switch and the third switch, and ground, and wherein the first control switch and the fourth switch form a current mirror, and the second dedicated circuit is connected between the common node of the second switch and the third switch, and the common node of the third switch and the fourth switch, and wherein the second dedicated circuit is configured to establish a voltage on the common node of the third switch and the fourth switch to conduct a short circuit test.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a short circuit detection apparatus for a switched capacitor converter. The invention may also be applied, however, to a variety of power converters. Hereinafter, various embodiments will be explained in detail with reference to the accompanying drawings.

Figure 1:
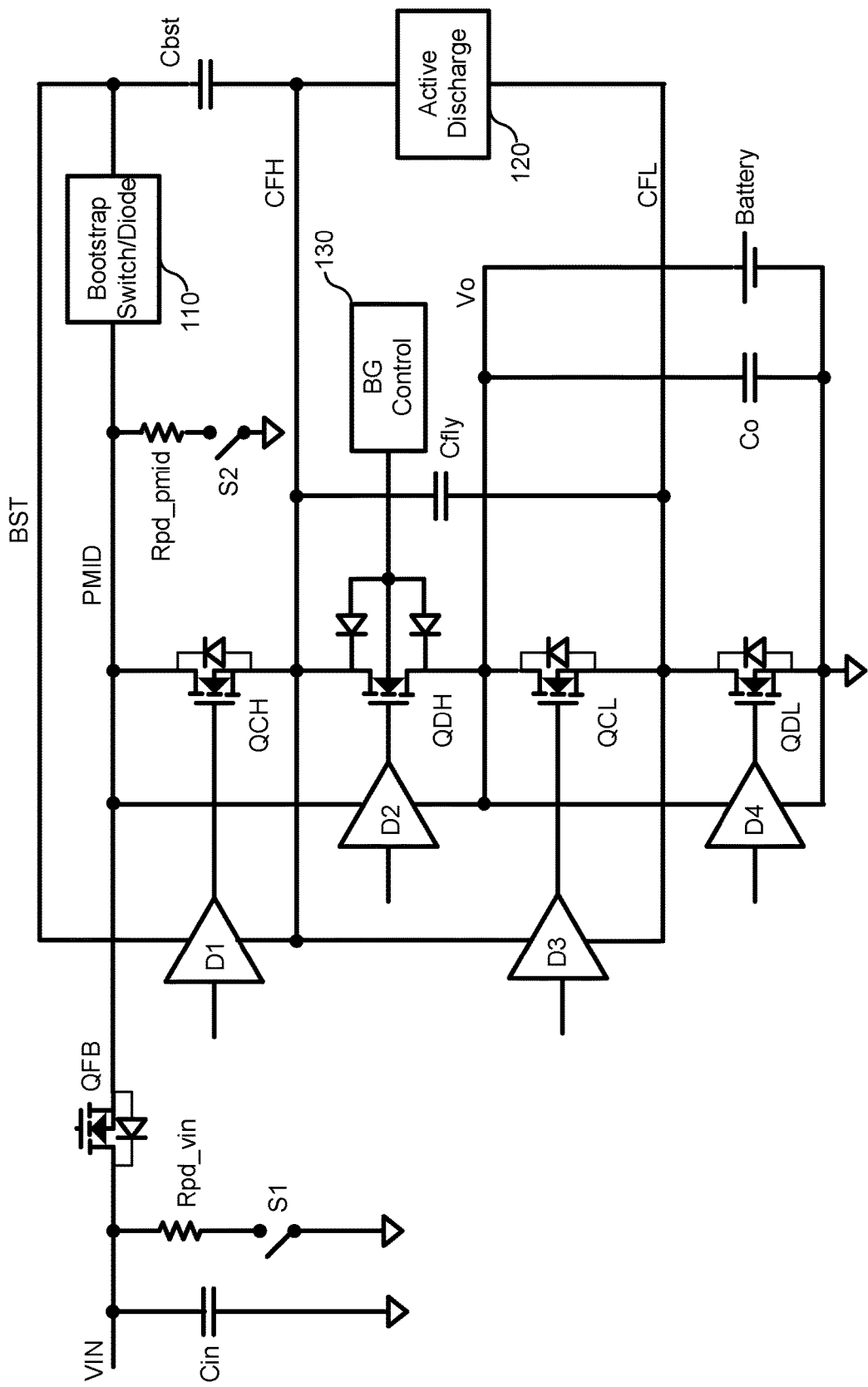
FIG. 1 illustrates a schematic diagram of a switched capacitor converter in accordance with various embodiments of the present disclosure.

FIG. 1 illustrates a schematic diagram of a switched capacitor converter in accordance with various embodiments of the present disclosure. An input voltage bus (PMID) of the switched capacitor converter is coupled to a charging source VIN through a switch QFB. An output (Vo) of the switched capacitor converter is coupled to a battery. The switch QFB may function as a load switch.

As shown in FIG. 1, an input capacitor Cin is connected between VIN and ground. An input voltage bus dissipation circuit is connected in parallel with the input capacitor Cin. The input voltage bus dissipation circuit comprises a resistor Rpd_vin and a switch S1 connected in series. A PMID dissipation circuit is connected between the input voltage bus PMID and ground. The PMID dissipation circuit comprises a resistor Rpd_pmid and a switch S2 connected in series. The PMID dissipation circuit is employed to discharge the input voltage bus PMID so that the voltage on the input voltage bus PMID is close to zero after the switched capacitor converter has been turned off. This ensures that at the beginning of the next power-up, the voltage on the input voltage bus PMID is approximately equal to zero.

As shown in FIG. 1, the switched capacitor converter comprises a first switch QCH, a second switch QDH, a third switch QCL and a fourth switch QDL connected in series between the input voltage bus PMID and ground. As shown in FIG. 1, each switch has a dedicated driver. A first driver D1 is configured to drive QCH. A second driver D2 is configured to drive QDH. A third driver D3 is configured to drive QCL. A fourth driver D4 is configured to drive QDL.

The switched capacitor converter further comprises a first capacitor Cfly, a second capacitor Cbst and a third capacitor Co. The first capacitor Cfly is connected between a common node (CFH) of switches QCH and QDH, and a common node (CFL) of switches QCL and QDL. The first capacitor Cfly may be alternatively referred to as a flying capacitor. An active discharge circuit 120 is connected in parallel with the flying capacitor Cfly. The active discharge circuit 120 is employed to discharge the voltage across the flying capacitor after the switched capacitor converter has been turned off.

The second capacitor Cbst is connected between a voltage bus BST and the node CFH. The second capacitor Cbst functions as a bootstrap capacitor. A bootstrap switch or a bootstrap diode 110 is used to charge the second capacitor Cbst. Throughout the description, Cbst may be alternatively referred to as a bootstrap capacitor.

The bootstrap capacitor Cbst is configured to provide bias power to the high-side drivers (e.g., the driver D1 for QCH). The third capacitor Co is connected between the output Vo and ground. The third capacitor Co is in parallel with the load (e.g., the battery shown in FIG. 1).

In some embodiments, the second switch QDH is implemented as an isolation switch. In particular, QDH provides isolation between the battery and the charging source VIN. As shown in FIG. 1, the bulk terminal of the second switch QDH is not connected to the source of the second switch QDH. The second switch QDH includes two body diodes. A first body diode is between the bulk terminal and the source terminal of QDH. A second body diode is between the bulk terminal and the drain terminal of QDH. These two body diodes are back-to-back connected. As a result of having the back-to-back connected body diodes, the second switch QDH functions as the isolation switch. After a turn-off signal is applied to the gate of the second switch QDH, the second switch QDH can provide isolation between the battery and the node CFH. More particularly, when the node CFH is shorted to ground, the second switch QDH prevents excessively high current from being drawn from the battery.

As shown in FIG. 1, a bulk control circuit 130 is connected to the common node of the two back-to-back connected diodes. The bulk control circuit 130 is employed to control the characteristics of the channel of the second switch QDH through adjusting the voltage potential at the bulk terminal of QDH. During the short circuit detection test, the body terminal of the switch is tied to ground through the bulk control circuit 130. Under this configuration, QDH functions as a bi-directional isolation switch.

In accordance with an embodiment, the switching elements of FIG. 1 may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switches QCH, QDH, QCL and QDL are implemented as single n-type transistors, a person skilled in the art would recognize there may be many variations, modifications and alternatives. For example, depending on different applications and design needs, all or at least some of the switches QCH, QDH, QCL and QDL may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

In operation, the switched capacitor converter operates in two different phases. In a first phase, the switches QCH and QCL are turned on and switches QDH and QDL are turned off. As a result of turning on QCH and QCL, the input power source VIN charges the flying capacitor Cfly and the output capacitor Co. In the first phase, the flying capacitor Cfly and the output capacitor Co are connected in series. In a second phase, the switches QDH and QDL are turned on and switches QCH and QCL are turned off. As a result of turning on QDH and QDL, the flying capacitor Cfly is connected in parallel with the output capacitor Co, and the energy stored in the flying capacitor Cfly and the output capacitor Co is discharged to the load (e.g., the battery shown in FIG. 1).

Figure 2:
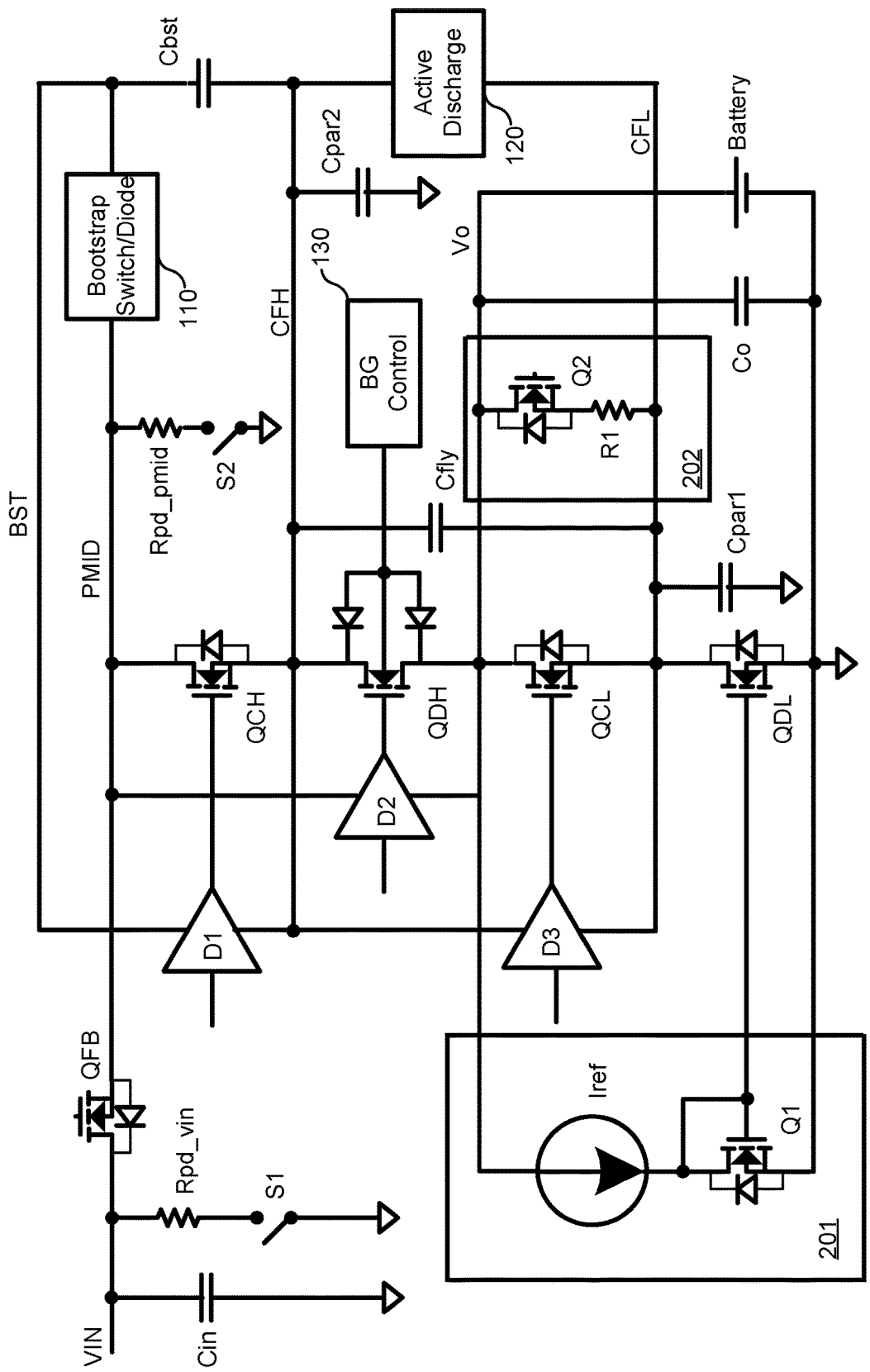
FIG. 2 illustrates a short circuit detection apparatus in accordance with various embodiments of the present disclosure.

FIG. 2 illustrates a short circuit detection apparatus in accordance with various embodiments of the present disclosure. The short circuit detection apparatus is employed to determine whether the switches and the flying capacitor of the switched capacitor converter are shorted. In some embodiments, the short circuit detection apparatus determines whether the drain terminal and/or the source terminal of the switch are shorted. As shown in FIG. 2, the short-circuit detection apparatus comprises a first dedicated circuit 201 and a second dedicated circuit 202.

The first dedicated circuit 201 comprises a reference current source Iref and a switch Q1. The switch and QDL form a current mirror. As shown in FIG. 2, the reference current source Iref is connected between Vo and the drain of the switch Q1. The ratio of the current flowing through the switch to the current flowing through QDL is equal to 1:M. M is a predetermined number.

The second dedicated circuit comprises a switch Q2 and a resistor R1. As shown in FIGS. 2, Q2 and R1 are connected in series between Vo and CFL.

In operation, prior to powering up the switched capacitor converter, a four-step short circuit detection method is applied to the switched capacitor converter. In a first step, a control circuit (e.g., control circuit 301 shown in FIG. 3) determines whether QFB or QDH is shorted. Before turning on any power switch, the control circuit is employed to check if the voltage on the input voltage bus PMID is expectedly low. The voltage on the input voltage bus PMID indicates whether QFB or QDH is shorted. In normal operation, before turning on any power switch of the switched capacitor converter, VIN is not applied to the input voltage bus PMID because QFB is turned off. In addition, the voltage of the battery is not applied to the input voltage bus PMID because QDH is an isolation switch and QDH is turned off. The voltage on the input voltage bus PMID remains low because prior to powering up the switched capacitor converter, the resistor Ppd_pmid pulls down the input voltage bus PMID to a level approximately equal to zero after the switch S2 has been turned on.

Figure 3:
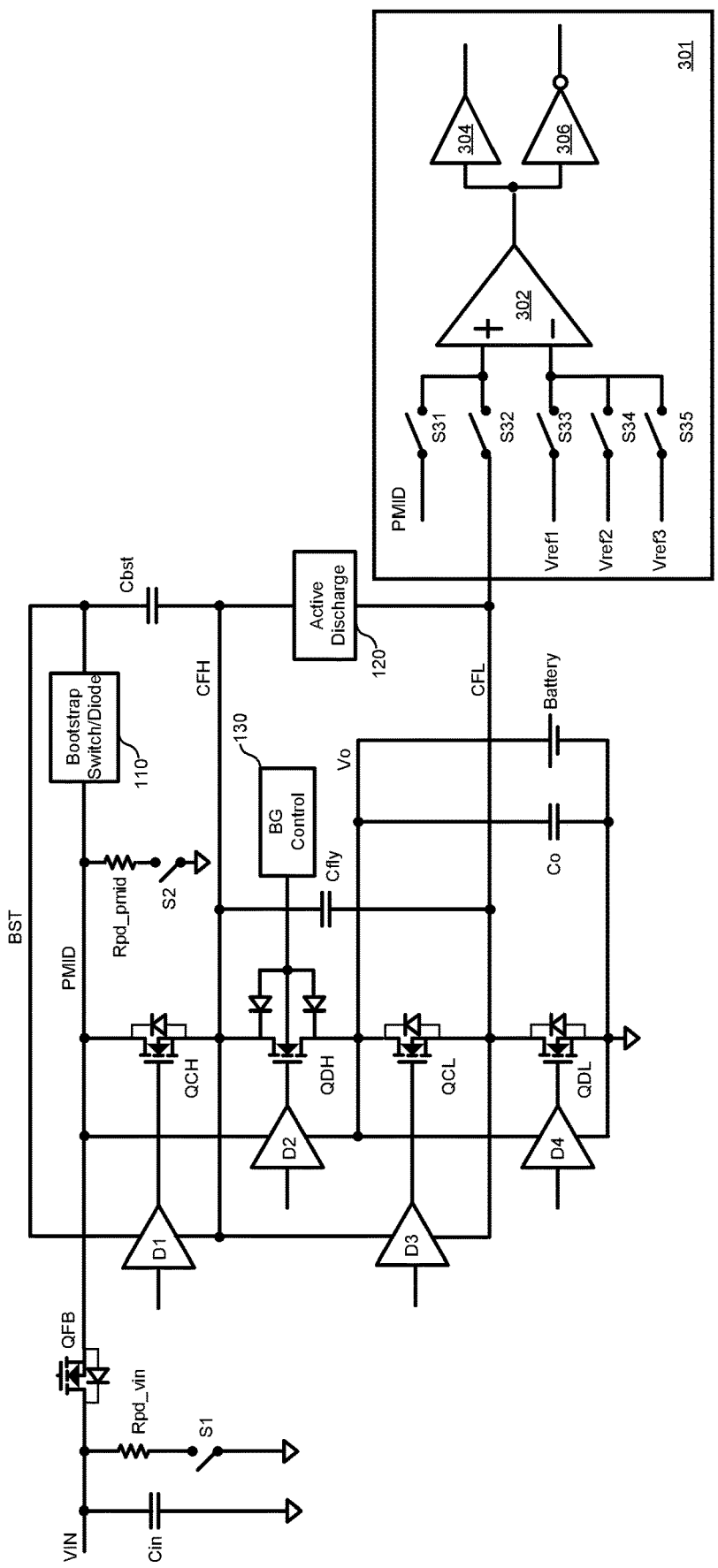
FIG. 3 illustrates a short circuit processing apparatus in accordance with various embodiments of the present disclosure.

In the first step, if the control circuit detects the voltage on the input voltage bus PMID is higher than a certain preset voltage, referred to as Vref1 in FIG. 3 (e.g., Vref1=0.5V), then there is a short either across QFB or QDH. The switched capacitor converter stops powering up. Otherwise, the testing result indicates neither QFB nor QDH is shorted. The control circuit proceeds to a second step of the short circuit test.

In the second step, the control circuit determines whether QDL or QCH is shorted. First, the first dedicated circuit 201 is turned on to drive the voltage across QDL (voltage on the node CFL) toward 0 V. In particular, Q1 and QDL form a current mirror. After the first dedicated circuit 201 has been turned on, a reference current Iref flows through Q1. The ratio of the current flowing through the switch Q1 to the current flowing through QDL is equal to 1:M. As such, a current equal to M×Iref flows through QDL. This current drives the voltage on the CFL node toward 0 V.

It should be noted that if QCL or QDH is shorted, the first dedicated circuit 201 may be not able to drive the voltage on the node CFL toward 0 V. This, however, does not have an impact on this short circuit detection test.

Second, the second dedicated circuit 202 is turned on to drive up the voltage on the node CFL with a limited current to a designed voltage level V1 for a calculated time t1. It should be noted that the charging voltage/current comes from the battery coupled to Vo. After t1, the control circuit checks if the voltage on the node CFL is higher than a predetermined reference voltage level Vref2 (shown in FIG. 3). If the voltage on the node CFL is higher than Vref2, it indicates neither QDL nor QCH is shorted. The control circuit proceeds to a third step of the short circuit test.

In the second step, the first dedicated circuit 201 is used to drive the voltage on the node CFL toward 0 V for a limited period t0. This limited period t0 can be expressed as:

$$t0 = (Cpar1 + Cpar2) \times Vo / Ilim \quad (1)$$

In Equation (i), Cpar1 is the total parasitic capacitance seen from CFL to AC grounds. In calculating Cpar1, all DC sources are considered as AC grounds. (e.g., the GND node and the Vo node). Cpar2 is the total parasitic capacitance seen from CFH to AC grounds. Vo is the maximum battery voltage allowed in this system. Ilim is the current limit value of QDL. For example, in some embodiments, Cpar1 is equal to 500 pF. Cpar2 is equal to 500 pF. Vo is equal to 4.6 V. Ilim is equal to 1 mA. According to Equation (1), t0 is about 5 microseconds. In a real application, t0 may be set to a value greater than the calculated value due to the settling time of the gate voltage of QDL.

It should be noted that the node CFH is not directly connected to the node CFL. The flying capacitor Cfly is connected between CFH and CFL. The capacitance of Cfly is much greater than the parasitic capacitance (e.g., the capacitance of Cpar2). In the AC analysis, Cfly provides a low impedance path between CFH and CFL. As such, the total parasitic capacitance seen from CFH to AC grounds should be combined with the total parasitic capacitance seen from CFL to AC grounds in Equation (1).

It should be noted there may be various implementations of the second dedicated circuit 202. The various implementations fall into two main categories. In a first category, a circuit charges the node CFL up to a preset voltage V1 through a resistor R1. In a second category, a circuit uses a fixed current to charge the nod e CFL up to a preset voltage V1.

For the first category of the various implementations of the second dedicated circuit 202 (shown in FIG. 2), the minimum period for the second dedicated circuit 202 to be turned on is $t1_{min1}$. In some embodiments, $t1_{min1}$ can be expressed by the following equation:

$$t1_{min1} = \tau \times \ln\left[\frac{V1}{V1 - Vref2}\right] \quad (2)$$

In Equation (2), τ is the time constant governed approximately by R1×(Cpar1+Cpar2). For example, R1 is equal to 100 kilo-ohms. Cpar1 is equal to 500 pF, and Cpar2 is equal to 500 pF. Accordingly, τ is equal to 100 us. In some embodiments, V1 is equal to 0.5 V, and Vref2 is equal to 0.2 V. According to Equation (2), $t1_{min1}$ is approximately equal to 51 microseconds. In a real application, a margin may be added to $t1_{min1}$. For example, $t1_{min1}$ may be equal to 100 microseconds.

For the second category of the various implementations of the second dedicated circuit 202, the minimum period for the second dedicated circuit to be turned on is equal to $t1_{min2}$. In some embodiments, $t1_{min2}$ can be expressed by the following equation:

$$t1_{min2} = (Cpar1 + Cpar2) \times Vref2 / I\_fix \quad (3)$$

In Equation (3), I_fix is the fixed current used to charge the node CFL up to the preset voltage V1. It should be noted that, in a real application, a margin may also be added to $t1_{min2}$ of Equation (3).

The upper limit of t1 is determined such that the second dedicated circuit 202 is not able to charge the flying capacitor Cfly up to Vref2. This principle gives the maximum allowed value of t1. For the first category of the various implementations of the second dedicated circuit 202, the maximum allowed value of t1 can be expressed by the following equation:

$$t1_{max1} = R1 \times Cfly \times \ln\left[\frac{V1}{V1 - Verf2}\right] \quad (4)$$

For the second category of the various implementations of the second dedicated circuit, the maximum allowed value of t1 can be expressed by the following equation:

$$t1_{max2} = Cfly \times Vref2 / I\_fix \quad (5)$$

In operation, the second dedicated circuit 202 drives up the voltage on the node CFL with a limited current to a designed voltage level V1 for the calculated time t1. After t1, the control circuit checks if the voltage on the node CFL is higher than a predetermined reference voltage level Vref2. If the voltage on the node CFL is higher than Vref2, it indicates neither QDL nor QCH is shorted. Otherwise, at least one of QDL or QCH's drain and/or source is shorted. After passing the second step, the control circuit proceeds to a third step of the short circuit test.

In the third step, the control circuit determines whether QCL is shorted. The first dedicated circuit 201 is turned on to drive the voltage across QDL (the voltage on the node CFL) down with a limited current Ilim for a calculated time t2. On expiration of this time (t2), the control circuit checks if the voltage on the node CFL is lower than a calculated reference voltage level Vref3 (shown in FIG. 3). If the voltage on the node CFL is lower than Vref3, it indicates QCL is not shorted. The control circuit proceeds to the fourth step.

The minimum value for t2 is given by the following equation:

$$t2 = (Cpar1 + Cpar2) \times (V1 - Vref3) / Ilim \quad (6)$$

In some embodiments, Cpar1 is equal to 500 pF, and Cpar2 is equal to 500 pF. V1 is equal to 0.5V, and Vref3 is equal to 0.1V. According to Equation (6), the minimum value of t2 is equal to 0.4 microseconds. In a real application, a margin may be added to t2 to account for the gate settling time of QDL.

In some embodiments, the maximum allowed value for t2 is given by the following equation:

$$t2 = Cfly \times (V1 - Vref3) / Ilim \quad (7)$$

In the fourth step, the control circuit determines whether Cfly is shorted. After QFB is turned on, and the voltage on the input voltage bus PMID is ramped up to VIN, QDH is turned on. The turned-on QDH connects CFH to Vo. With a current limit, QDL drives CFL down so as to pre-charge Cfly to a voltage level equal to Vo. If there is a short across Cfly, CFL cannot be driven down to 0V by QDL. After a calculated time t3, the control circuit checks if the voltage on the node CFL is less than a predetermined level Vref3. In some embodiments, Vref3 is close to 0V. If the voltage on the node CFL is less than Vref3, it indicates there is no short across Cfly. The control circuit can proceed with powering up the switched capacitor converter.

It should be noted that the active discharge circuit 120 shown in FIG. 2 is disabled during the short circuit detection process described above. In other words, the active discharge circuit 120 is equivalent to open circuit during the short circuit detection process.

FIG. 3 illustrates a short circuit processing apparatus in accordance with various embodiments of the present disclosure. A control circuit 301 comprises a comparator 302, a buffer 304 and an inverter 306. In the discussion above with respect to FIG. 2, Vref1, Vref2 and Vref3 are used as references to determine whether a switch or the flying capacitor is shorted. As shown in FIG. 3, a single comparator 302 with its positive and negative inputs being multiplexed to be the according signals needed in different detection steps described above with respect to FIG. 2. As shown in FIG. 3, the positive input of the comparator 302 is connected to the input voltage bus PMID and CFL through switches S31 and S32, respectively. The negative input of the comparator 302 is connected to Vref1, Vref2 and Vref3 through switches S33, S34 and S35, respectively. The output of the comparator 302 is fed into an input of a buffer 304 and an input of an inverter 306. The outputs of the buffer 304 and the inverter 306 are used to determine whether the switches and the flying capacitor of the switched capacitor converter are shorted.

Figure 4:
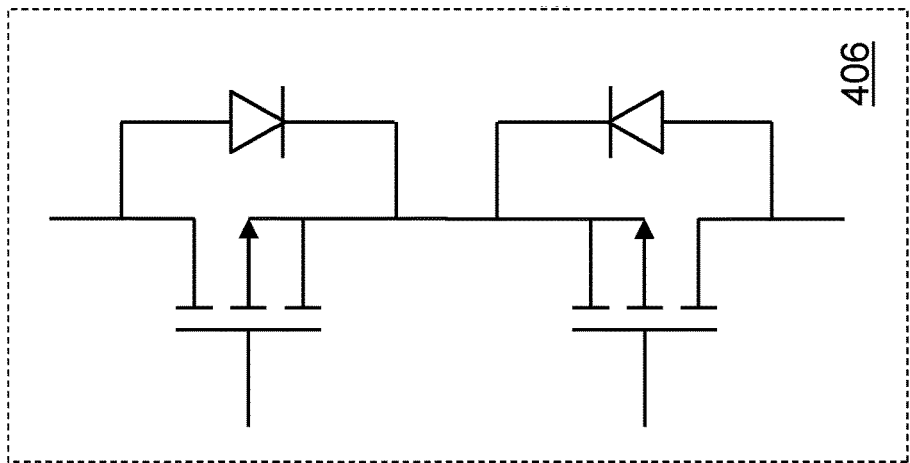
FIG. 4 illustrates three back-to-back connected transistors in accordance with various embodiments of the present disclosure.
Figure 4:
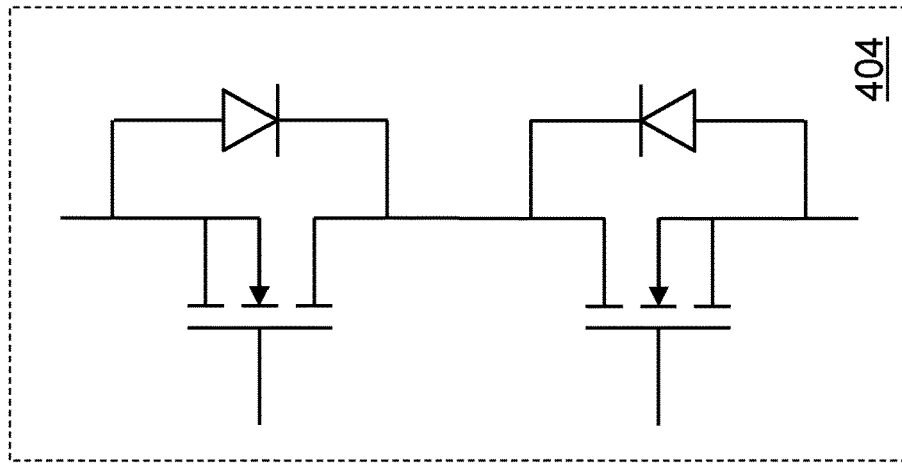
Figure 4:
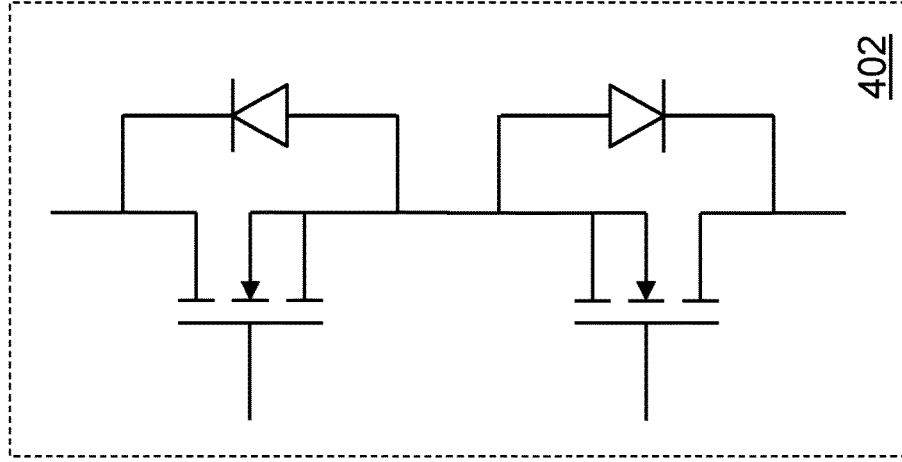

FIG. 4 illustrates three back-to-back connected transistors in accordance with various embodiments of the present disclosure. A first dashed box 402 includes back-to-back connected n-type transistors. The drains of these two n-type transistors are directly connected to each other. The back-to-back connected n-type transistors in box 402 can be used to replace the switch QDH shown in FIG. 1-3 above. This replacement is fully intended to be included within the scope of the embodiments discussed herein.

A second dashed box 404 includes back-to-back connected n-type transistors. The sources of these two n-type transistors are directly connected to each other. The back-to-back connected n-type transistors in box 404 can be used to replace the switch QDH shown in FIG. 1-3 above. This replacement is fully intended to be included within the scope of the embodiments discussed herein.

A third dashed box 406 includes back-to-back connected p-type transistors. The back-to-back connected p-type transistors in box 406 can be used to replace the switch QDH shown in FIG. 1-3 above. This replacement is fully intended to be included within the scope of the embodiments discussed herein.

It should be noted that the embodiments discussed above with respect to FIGS. 1-4 are based on a single phase switched capacitor converter. The embodiments discussed above (the short circuit detection method) can be extended to multiple-phase switched capacitor converters as each phase can be independently checked according to the method described above.

Figure 5:
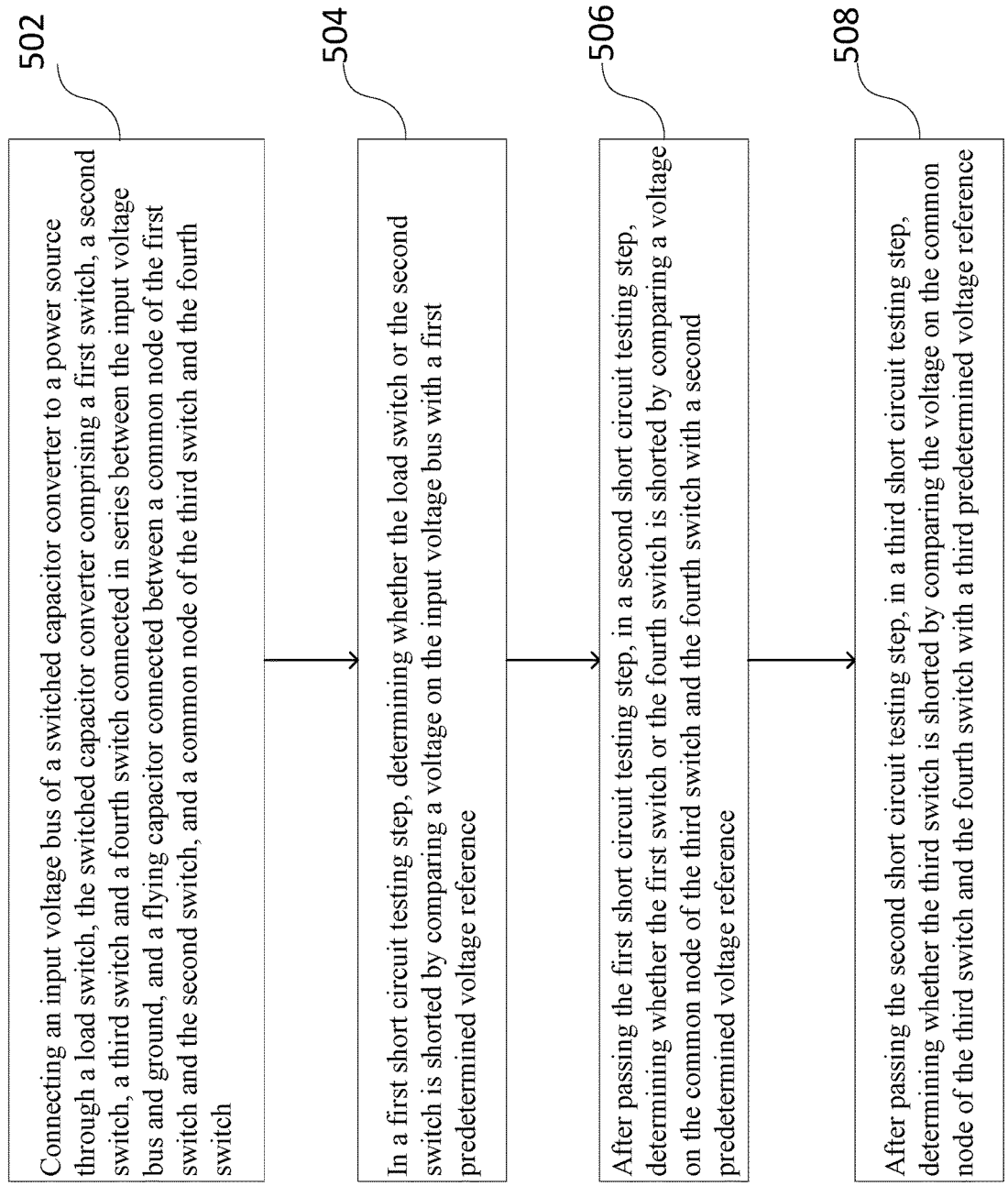
FIG. 5 illustrates a flow chart of a short circuit detection method for the switched capacitor converter shown in FIG. 1 in accordance with various embodiments of the present disclosure.

FIG. 5 illustrates a flow chart of a short circuit detection method for the switched capacitor converter shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

At step 502, an input voltage bus of a switched capacitor converter is connected to a power source through a load switch. The output of the switched capacitor converter is connected to a load such as a battery. The switched capacitor converter comprises a first switch, a second switch, a third switch and a fourth switch connected in series between the input voltage bus and ground, and a flying capacitor connected between a common node of the first switch and the second switch, and a common node of the third switch and the fourth switch.

At step 504, in a first short circuit testing step, a control circuit determines whether the load switch or the second switch is shorted by comparing a voltage on the input voltage bus with a first predetermined voltage reference.

At step 506, after passing the first short circuit testing step, in a first short circuit testing step, the control circuit determines whether the first switch or the fourth switch is shorted by comparing the voltage on the common node of the third switch and the fourth switch with a second predetermined voltage reference.

At step 508, after passing the second short circuit testing step, in a third short circuit testing step, the control circuit determines whether the third switch is shorted by comparing the voltage on the common node of the third switch and the fourth switch with a third predetermined voltage reference.

The method further comprises after passing the third short circuit testing step, turning on the load switch to establish the voltage on the input voltage bus, turning on the second switch, and in a fourth short circuit testing step, determining whether the flying capacitor is shorted by comparing the voltage on the common node of the third switch and the fourth switch with a fourth predetermined voltage reference.

The method further comprises discharging the voltage on the common node of the third switch and the fourth switch with a predetermined current, and after a predetermined time, comparing the voltage on the common node of the third switch and the fourth switch with the fourth predetermined voltage reference to determine whether the flying capacitor is shorted.

The method further comprises discharging the input voltage bus using a resistor and a switch coupled between the input voltage bus and ground after the switched capacitor converter has been turned off, and during the first short circuit testing step, after turning off the load switch, comparing the voltage on the input voltage bus with the first predetermined voltage reference to determine whether the load switch or the second switch is shorted.

The method further comprises in the second short circuit testing step, driving a voltage across the fourth switch toward zero volts for a predetermined time using a current mirror, charging the voltage on the common node of the third switch and the fourth switch with a predetermined current, and after a predetermined time, comparing the voltage on the common node of the third switch and the fourth switch with the second predetermined voltage reference to determine whether the first switch or the fourth switch is shorted.

The method further comprises in the third short circuit testing step, driving a voltage across the fourth switch toward zero volts for a predetermined time with a predetermined current, and comparing the voltage on the common node of the third switch and the fourth switch with the third predetermined voltage reference to determine whether the third switch is shorted.

With respect to a first step of a short circuit detection method, the method further comprises discharging the input voltage bus using a resistor and a switch coupled between the input voltage bus and ground after the switched capacitor converter has been turned off, and in the first step, maintaining the load switch in a non-conducting state, and determining at least one of the load switch and the second switch is shorted when the voltage on the input voltage bus is higher than the first predetermined voltage reference.

With respect to a second step of the short circuit detection method, the method further comprises in the second step, driving a voltage across the fourth switch toward zero volts for a first predetermined time using a current mirror, charging the voltage on the common node of the third switch and the fourth switch with a second predetermined current, and after a second predetermined time, determining at least one of the first switch and the fourth switch is shorted when the voltage on the common node of the third switch and the fourth switch is less than the second predetermined voltage reference.

With respect to a third step of the short circuit detection method, the method further comprises in the third step, driving a voltage across the fourth switch toward zero volts for a predetermined time with a predetermined current, and determining the third switch is shorted when the voltage on the common node of the third switch and the fourth switch is higher than the third predetermined voltage reference.

Figure 6:
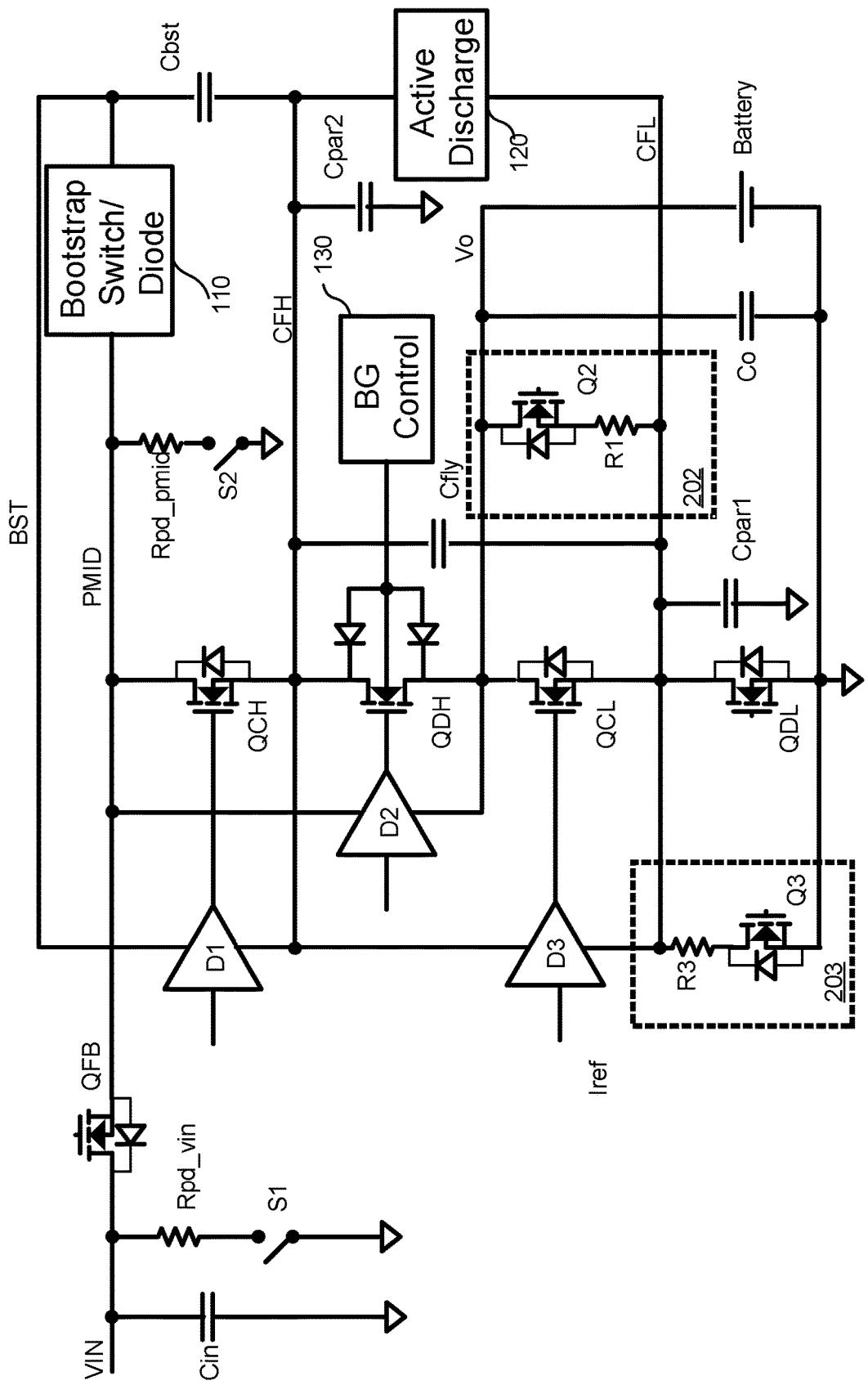
FIG. 6 illustrates another short circuit detection apparatus in accordance with various embodiments of the present disclosure.

FIG. 6 illustrates another short circuit detection apparatus in accordance with various embodiments of the present disclosure. The switched capacitor converter shown in FIG. 6 is similar to that shown in FIG. 1, and hence is not discussed in further detail herein.

As shown in FIG. 6, the short-circuit detection apparatus comprises a second dedicated circuit 202 and a third dedicated circuit 203. Referring back to FIG. 2, the third dedicated circuit 203 is employed to replace the first dedicated circuit 201. The short circuit detection apparatus is employed to determine whether the switches and the flying capacitor of the switched capacitor converter are shorted.

The second dedicated circuit 202 comprises a switch Q2 and a resistor R1. As shown in FIG. 6, the switch Q2 and the resistor R1 are connected in series between Vo and CFL. The third dedicated circuit 203 comprises a switch Q3 and a resistor R3. As shown in FIG. 6, the resistor R3 and the switch Q3 are connected in series between CFL and ground.

In operation, prior to powering up the switched capacitor converter, a three-step short circuit detection method is applied to the switched capacitor converter. In a first step of the short circuit detection method, the short circuit detection of QDH can be carried out through a voltage measurement at the common node of the switches QDH and QCH. In particular, before the switched capacitor converter is powered on, the body switchable switch QDH is configured such that the body terminal is connected to its drain terminal of QDH. As a result of having this connection, the battery voltage applied to the source terminal of QDH cannot pass through QDH because the body terminal is connected to the drain terminal of QDH. As such, the voltage on the node CFH should be low unless QDH is shorted. In other words, the voltage on the node CFH should be close to zero. If the voltage on the node CFH is higher than a predetermined threshold, it indicates that the switch QDH is shorted.

Referring back to FIG. 2, the third dedicated circuit 203 is employed to replace the first dedicated circuit 201 shown in FIG. 2. The resistor R3 and the switch Q3 are used to discharge the node CFL. In a second step of the short circuit detection method, the switch Q3 is first turned on to gradually discharge the node CFL. After a predetermined duration, Q3 is turned off, and Q2 is turned on such that the battery voltage starts to charge the node CFL. After a second predetermined time interval, the voltage on the node CFL is measured and compared to a predetermined threshold. If the voltage on the node CFL is higher than the predetermined threshold, it indicates that neither the switch QDL nor the switch QCH is shorted. It is worth pointing out that the voltage on the node CFL higher than the predetermined threshold also indicates that the switch QCH is not shorted. This is because when the predetermined duration is very short, the large capacitance of the flying capacitor Cfly can be considered as a short circuit. Being able to pull up the node CFL indicates that the switch QCH does not provide a short circuit between the node CFH to the voltage bus PMID, which is considered as AC ground.

In a third step of the short circuit detection method, the switch Q2 is turned off and the switch Q3 is turned on to discharge the node CFL. After yet another predetermined time interval, the voltage on the node CFL is measured again. If the voltage on the node CFL is lower than a predetermined threshold, then it can be determined that the switch QCL is not shorted.

In fact, when the third dedicated circuit 203 is used, the sequence of the second step and the third step of the short circuit detection method are interchangeable. For example, after the switch Q3 is turned on to discharge the node CFL, a measurement of the voltage on the node CFL can be compared to the predetermined threshold voltage. If the voltage on the node CFL could not be pulled down to a value close to zero, then it indicates that the switch QCL is not able to block the battery voltage from reaching the node CFL. In other words, the switch QCL is shorted.

The above-mentioned short circuit detection methods can be applied to other switched capacitor converter topologies, such as dual phase 2:1 switched cap converters and switched capacitor converters having higher voltage conversion ratios.

Figure 7:
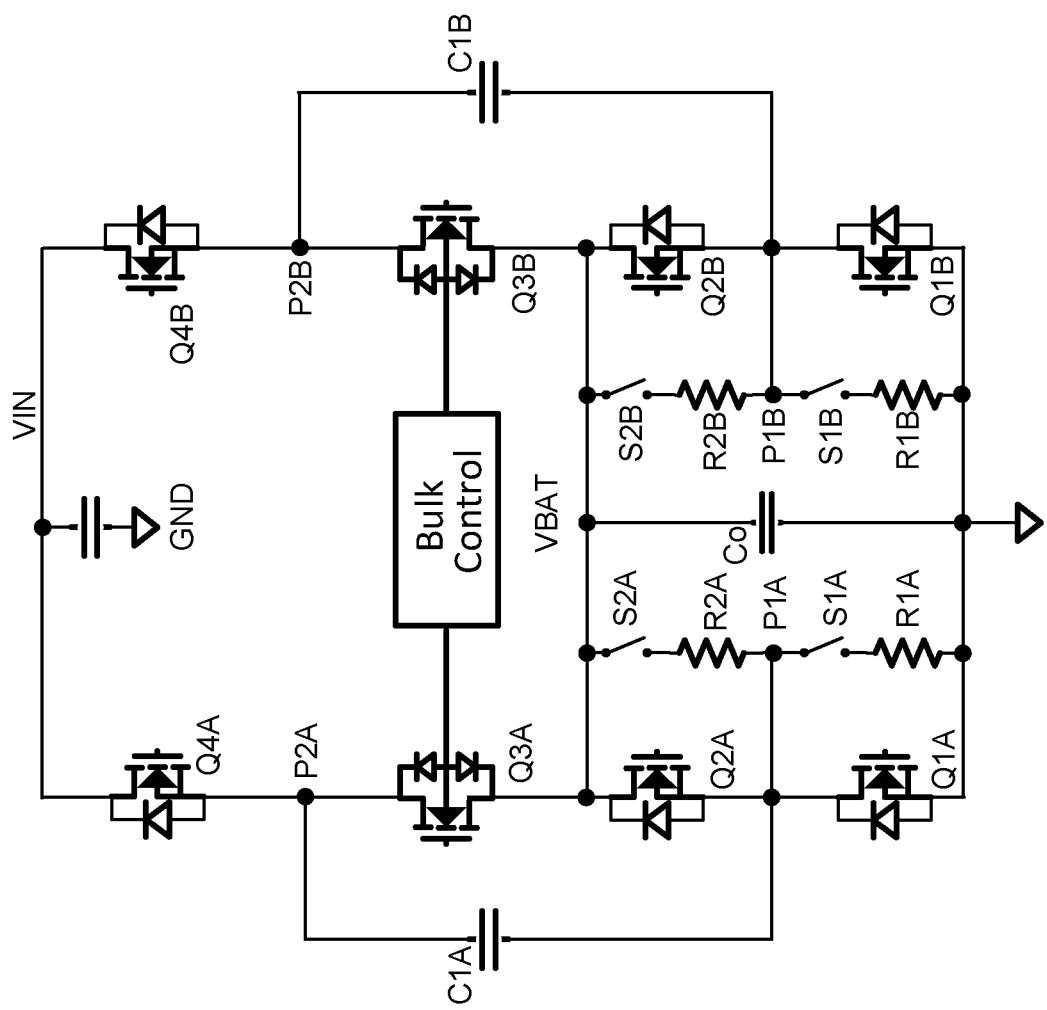
FIG. 7 illustrates a dual phase 2:1 switched capacitor converter in accordance with various embodiments of the present disclosure.

FIG. 7 illustrates a dual phase 2:1 switched capacitor converter in accordance with various embodiments of the present disclosure. A first phase comprises switches Q4A, Q3A, Q2A and Q1A connected in series between VIN and ground. The first phase further comprises a flying capacitor C1A connected between a common node of switches Q4A and Q3A, and a common node of switches Q2A and Q1A. A second phase comprises switches Q4B, Q3B, Q2B and Q1B connected in series between VIN and ground. The second phase further comprises a flying capacitor C1B connected between a common node of switches Q4B and Q3B, and a common node of switches Q2B and Q1B.

The third switch Q3A of the first phase and the third switch Q3B of the second phase are configured as body switching switches. Before the switched capacitor converter is powered on, the body terminals of these two switches Q3A and Q3B are connected to respective drain terminals of these two switches. As shown in FIG. 7, the third switch Q3A comprises a first diode connected between a drain and a bulk terminal of the third switch Q3A, and a second diode connected between a source and the bulk terminal of the third switch Q3A. The first diode and the second diode of Q3A are back-to-back connected. As shown in FIG. 7, the anode of the first diode and the anode of the second diode are connected to the bulk terminal of the third switch Q3A. Characteristics of a channel of the third switch Q3A are controlled by a bulk control unit through adjusting a voltage potential at the bulk terminal of the third switch Q3A. The structure of Q3B is similar to that of Q3A, and hence is not discussed herein.

During normal operation, the switches Q1A, Q3A, Q2B, Q4B, and switches Q1B, Q3B, Q2A, Q4A switches on and off alternatively at a 50% duty cycle to achieve twice the current output and reduced output voltage ripple as compared to the single phase 2:1 switched capacitor circuit shown in FIG. 6.

From the short circuit detection perspective, these two phases can be treated independently. The same short circuit detection process as described above is applicable to each phase. In a first step, the short circuit status of switches Q3A and Q3B can be determined by measuring the voltage on the nodes P2A and P2B, respectively. In particular, switches Q3A and Q3B are not shorted if the voltages on the nodes P2A and P2B are lower than a predetermined voltage threshold. The second step and the third step are interchangeable. In these two steps, the nodes P1A and P1B are discharged through R1A/S1A and R1B/S1B, respectively, and charged through R2A/S2A and R2B/S2B respectively by the battery coupled to the output of the dual phase 2:1 switched capacitor converter. During this process, the voltages on nodes P1A and P1B are monitored and compared to respective predetermined voltage thresholds to determine if any switch of Q1A, Q2A, Q3A and Q4A is shorted.

It should be noted that the short circuit detection sequence in one phase does not need to be the same as that of the other phase. For example, the short circuit detection of the switch Q2A could happen at the same time as the switch Q1B, vice versa.

Figure 8:
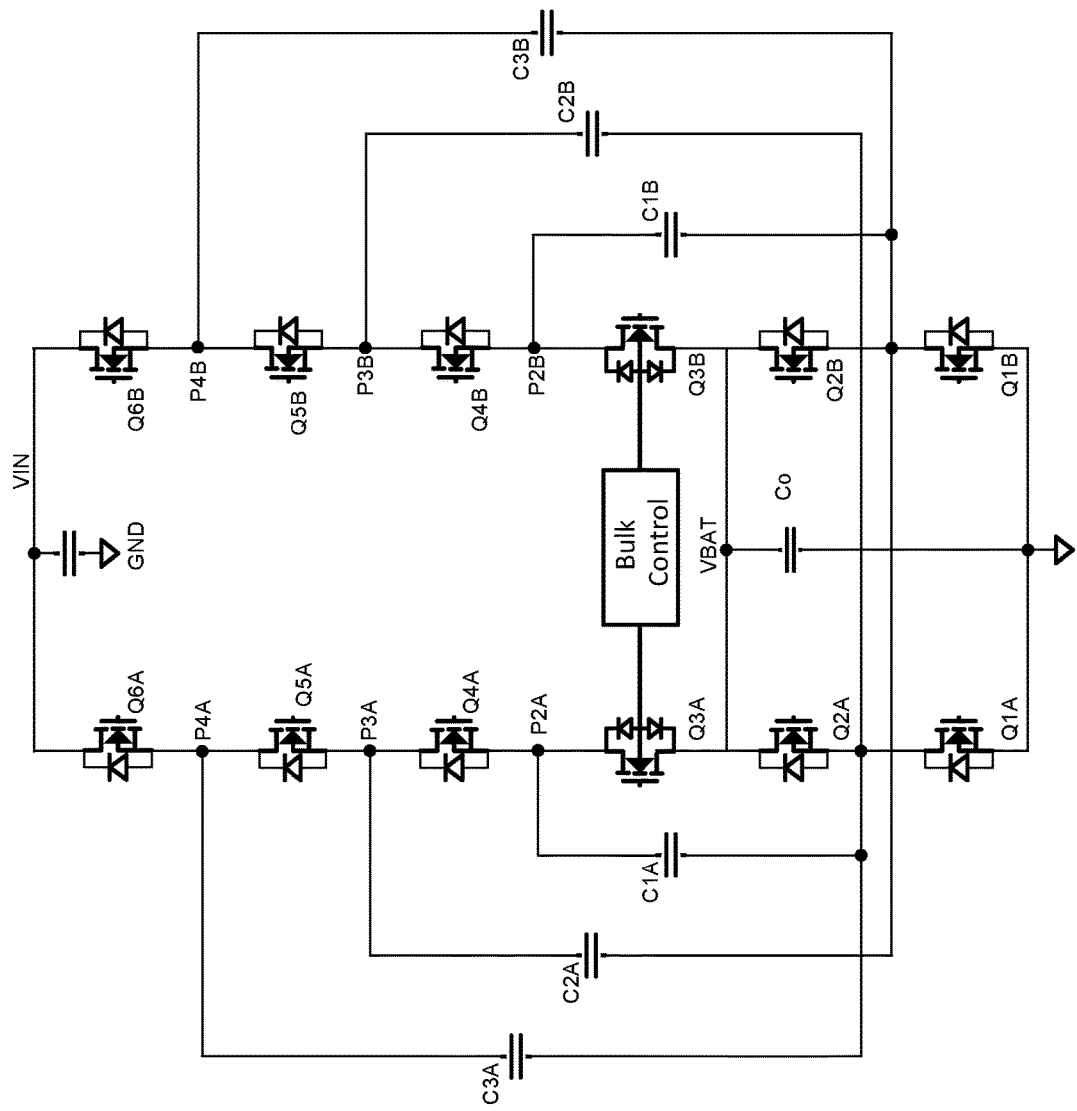
FIG. 8 illustrates a dual phase Dickson 4:1 converter in accordance with various embodiments of the present disclosure.

FIG. 8 illustrates a dual phase Dickson 4:1 converter in accordance with various embodiments of the present disclosure. A first phase comprises switches Q6A, Q5A, Q4A, Q3A, Q2A and Q1A connected in series between VIN and ground. A second phase comprises switches Q6B, Q5B, Q4B, Q3B, Q2B and Q1B connected in series between VIN and ground. The dual phase Dickson 4:1 converter further comprises flying capacitors C1A, C2A, C3A, C1B, C2B and C3B.

The flying capacitor C1A is connected between a common node of switches Q4A and Q3A, and a common node of switches Q2A and Q1A. The flying capacitor C2A is connected between a common node of switches Q5A and Q4A, and a common node of switches Q2B and Q1B. The flying capacitor C3A is connected between a common node of switches Q6A and Q5A, and the common node of switches Q2A and Q1A. The flying capacitor C1B is connected between a common node of switches Q4B and Q3B, and the common node of switches Q2B and Q1B. The flying capacitor C2B is connected between a common node of switches Q5B and Q4B, and the common node of switches Q2A and Q1A. The flying capacitor C3B is connected between a common node of switches Q6B and Q5B, and the common node of switches Q2B and Q1B.

In comparison with the converter shown in FIG. 7, the additional flying capacitors C2A, C2B, C3A and C3B, and switches Q5A, Q5B, Q6A and Q6B are employed to boost the voltage conversion ratio from 2:1 to 4:1.

The third switch Q3A of the first phase and the third switch Q3B of the second phase are configured as body switching switches. Before the switched capacitor converter is powered on, the body terminals of switches Q3A and Q3B are connected to respective drain terminals of these two switches.

Figure 9:
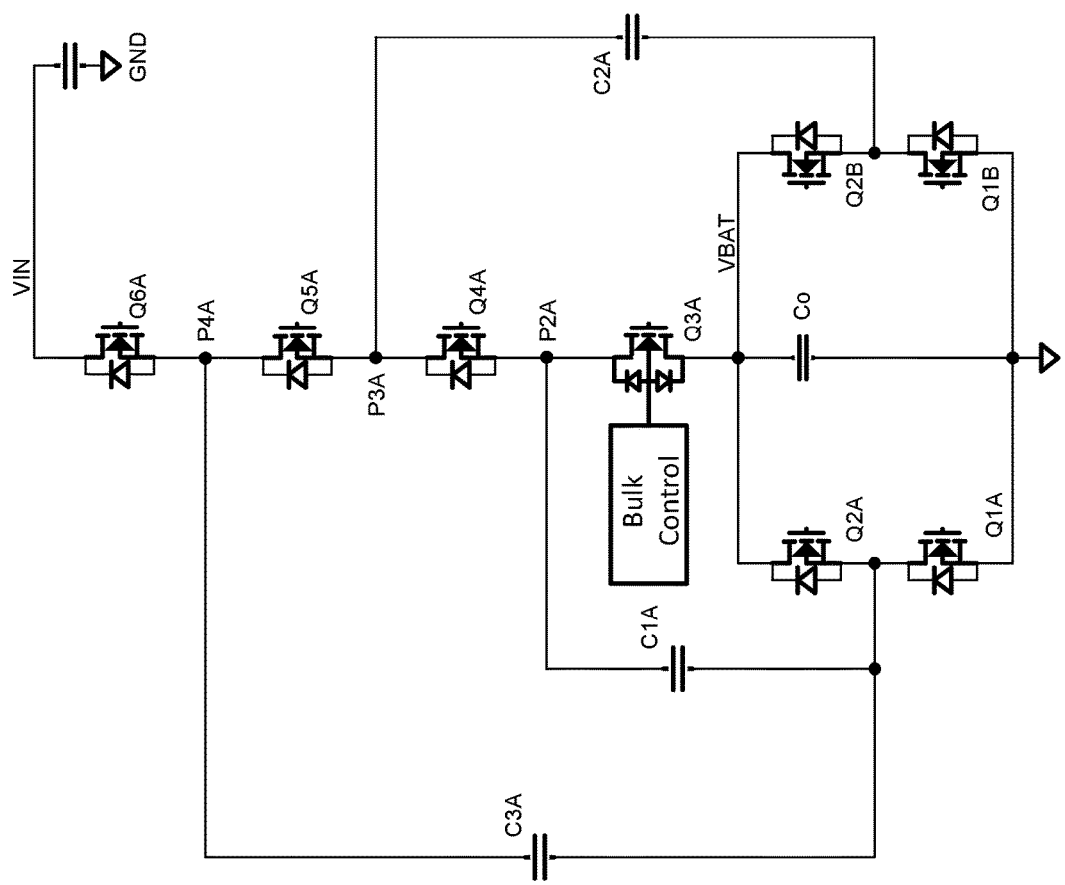
FIG. 9 illustrates a single-phase equivalent circuit of the dual phase Dickson 4:1 converter shown in FIG. 8 in accordance with various embodiments of the present disclosure.

FIG. 9 illustrates a single-phase equivalent circuit of the dual phase Dickson 4:1 converter shown in FIG. 8 in accordance with various embodiments of the present disclosure. For the purpose of describing the short circuit detection procedure, the dual phase Dickson 4:1 converter shown in FIG. 8 can be simplified to a single-phase circuit as shown in FIG. 9. Based on this single-phase equivalent circuit, the short circuit detection procedure described above is generally applicable to both phases in a same manner.

The first phase of the dual phase Dickson 4:1 converter and two switches Q1B and Q2B of the second phase are illustrated in FIG. 9. This single-phase equivalent circuit is used to describe the short circuit detection procedure of the first phase. The single-phase equivalent circuit of the second phase of the dual phase Dickson 4:1 converter is similar to that shown in FIG. 9, and hence is not shown for avoiding repetition.

Figure 10:
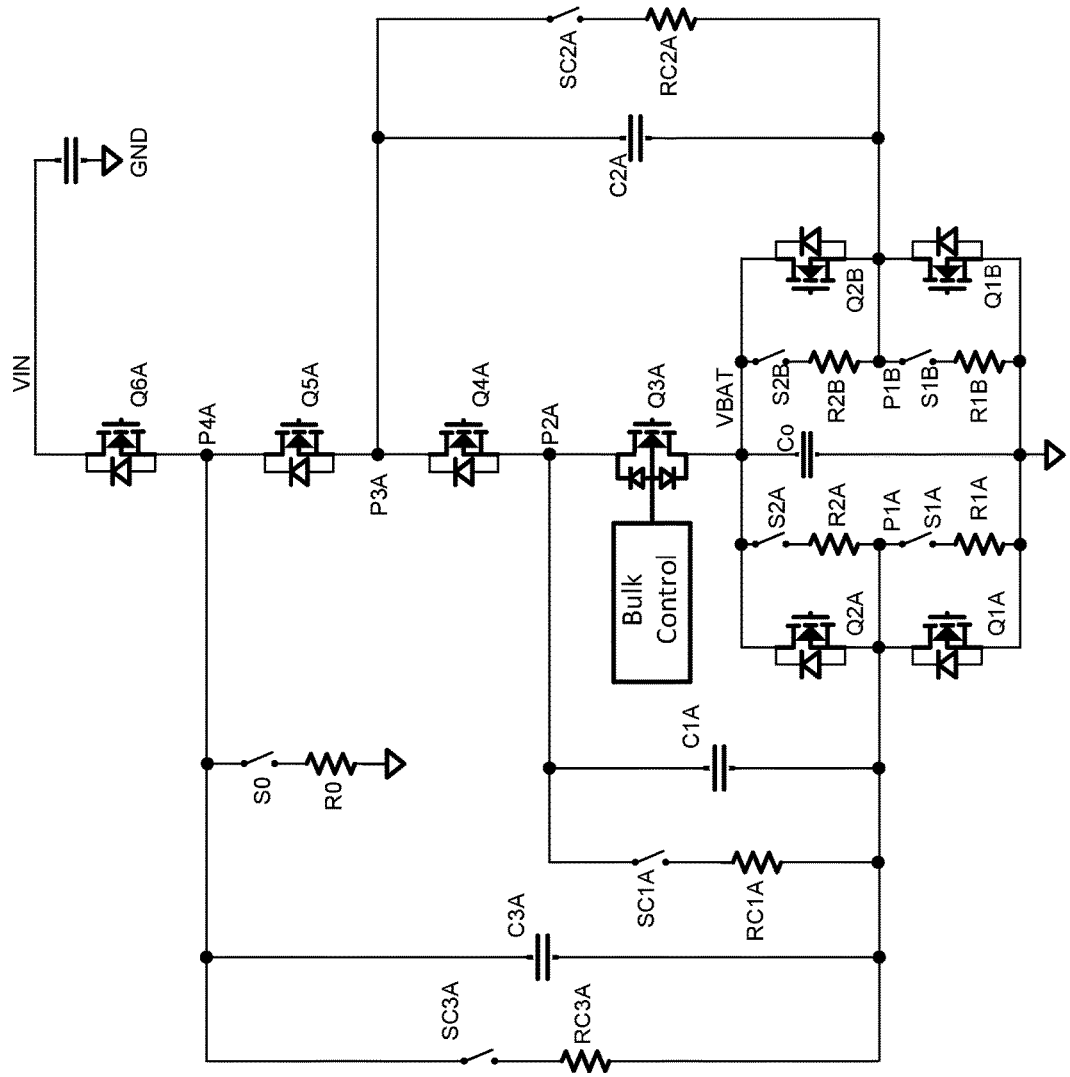
FIG. 10 illustrates a short circuit detection apparatus for detecting shorted elements in the dual phase Dickson 4:1 converter in accordance with various embodiments of the present disclosure.

FIG. 10 illustrates a short circuit detection apparatus for detecting shorted elements in the dual phase Dickson 4:1 converter in accordance with various embodiments of the present disclosure. Auxiliary circuits are introduced to assist the short circuit detection. The auxiliary circuits include resistors R1A, R2A, R1B, R2B, R0, RC1A, RC2A, RC3A, and switches S1A, S2A, S1B, S2B, S0, SC1A, SC2A, SC3A. The auxiliary circuits form a plurality of discharge circuits for discharging flying capacitors and critical circuit nodes. In particular, prior to performing the short circuit detection test, the flying capacitor C1A is discharged through switch SC1A and resistor RC1A. It is done by connecting the resistor RC1A in parallel with the flying capacitor C1A through turning on the switch SC1A for a pre-determined period of time and then turning off switch SC1A. Similarly, prior to performing the short circuit detection test, the flying capacitors C2A is discharged through switch SC2A and resistor RC2A, and the flying capacitor C3A is discharged through switch SC3A and resistor RC3A.

Similar to the previous examples discussed above with respect to FIGS. 6-7, in a first step of the short circuit detection method, the short circuit detection apparatus is configured to determine whether the switch Q3A is shorted. This is done by measuring the voltage on the node P2A, which is supposed to be close to zero if the switch Q3A is able to block the battery voltage connected to the source terminal of the switch Q3A. If the voltage on the node P2A is greater than a predetermined threshold (e.g., 0.1 V), then it indicates that the switch Q3A is shorted or multiple components in the circuit shown in FIG. 10 are shorted. For example, Q6A, Q5A and Q4A are shorted. In these two situations, the system will be notified that a short circuit fault has been detected, and the power supplied to the circuit is halted. In this process, if the voltages on the nodes P3A and P4A are higher than the predetermined threshold, this indicates that a short occurs at the switch Q3A. On the other hand, if the node P4A is the only node where a voltage is higher than the predetermined threshold, this indicates that the switch Q6A is shorted.

Similar to the previous examples discussed above with respect to FIGS. 6-7, in a second step of the short circuit detection method, the short circuit detection apparatus is configured to determine whether the bottom switches are shorted. The main difference from the circuit in FIG. 7 is that neither node P3A nor node P4A in FIG. 9 is connected to a voltage bus. As a result, a unique combination of steps needs to be taken to detect the short circuit of the other switches of the switched capacitor converter. The second step includes two sub-steps. In a first sub-step, resistors R1A and R2B are connected into the circuit through turning on switch S1A and switch S2B while keeping resistors R2A and R1B disconnected from the circuit. After a predetermined period of time (e.g., 100 us), the voltages on nodes P1A and P1B are measured. If the switch Q2A is able to block the voltage from the battery, the voltage on node P1A should be sufficiently low. If any measured voltage is greater than a predetermined threshold (e.g., 0.1 V), it indicates that either one or multiple switches (e.g., Q2A, Q4A and/or Q6A) is shorted. It is easy to understand that if the switch Q2A is shorted, the node P1A is not able to be pulled down to ground by resistor R1A. During the predetermined period of time (e.g., 100 us) of a short circuit test, flying capacitors C1A, C2A and C3A are considered AC-shorted given the large capacitance of the flying capacitors. As a result of connecting resistor R2B between VBAT and node P1B, there is a possible pull-up path between node P1A and VBAT through resistor R2B, a shorted switch Q4A and AC-shorted flying capacitors C1A and C2A. Therefore, a low voltage on node P1A also indicates that Q4A is not shorted. Similarly, another pull-up path of node P1A is through a shorted Q6A and the AC-shorted flying capacitor C3A. Therefore, a low voltage on node P1A also indicates that Q6A is not shorted. In the first sub-step, the voltage on node P1B is also measured. If the switch Q1B is not shorted, the voltages on node P1B should be sufficiently high as this node is charged by the battery through resistor R2B. If the measured voltage is less than a predetermined threshold (e.g., 0.3 V), it indicates that switch Q1B is shorted. In a second sub-step, resistors R2A and R1B are connected into the circuit through turning on switch S2A and switch S1B while keeping resistors R1A and R2B disconnected from the circuit. After a predetermined period of time (e.g., 100 us), the voltages on nodes P1A and P1B are measured. If the switch Q2B is able to block the voltage from the battery, the voltage on node P1B should be sufficiently low. If the measured voltage is greater than a predetermined threshold (e.g., 0.1 V), it indicates that either one or multiple switches (e.g., Q2B and/or Q5A) are shorted. It is easy to understand that if switch Q2B is shorted, node P1B is not able to be pulled down to ground by resistor R1B. As a result of connecting resistor R2A between VBAT and node P1A, there is a possible pull-up path between node P1B and VBAT through resistor R2A, a shorted switch Q5A, AC-shorted flying capacitors C3A and C2A. Therefore, a low voltage on noted P1B also indicates that Q5A is not shorted. In the second sub-step, the voltage on node P1A is also measured. If the switch Q1A is not shorted, the voltage on node P1A should be sufficiently high as this node is charged by the battery through resistor R2A. If the measured voltage is less than a predetermined threshold (e.g., 0.3 V), it indicates that switch Q1A is shorted.

It should be noted that the above-mentioned steps do not need to be executed in this exact order, and the short circuit detection of the first switch (e.g., Q1A or Q1B) of one phase can be done at the same time as the short circuit detection of the second switch (e.g., Q2B or Q2A) of the other phase.

After the short circuit detection of the switches finishes without detecting a short circuit fault, the next step is to detect the short of the flying capacitors C1A, C2A and C3A. This short circuit detection is done by turning on the switch Q3A to allow the battery voltage to reach nodes P2A, P3A and P4A through switch Q3A and the body diodes of switches Q4A and Q5A. Optionally, the switches Q4A and Q5A can be controlled to be turned on to provide a conductive path for the charging current from the battery. Then, a weak pull-down circuit coupled to nodes P1A and P1B is enabled to connect the nodes P1A and P1B to ground with a limited current ability. After a sufficiently long time, if none of the flying capacitors is shorted, then the voltage on the nodes P1A and P1B should be sufficiently close to ground potential. If the voltage on node P1A or P1B is greater than a predetermined threshold (e.g., 0.1 V), then the corresponding flying capacitor is shorted.

Figure 11:
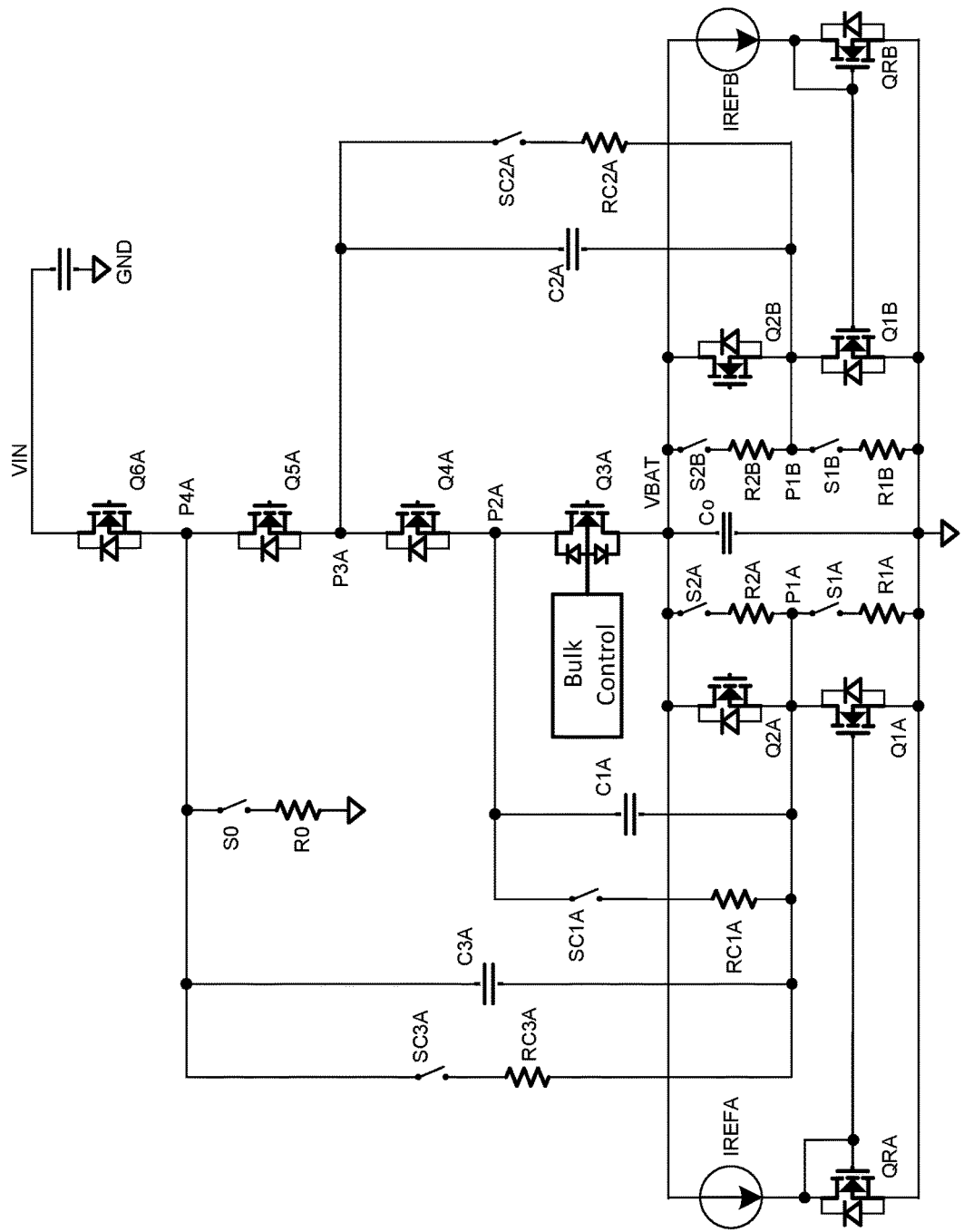
FIG. 11 illustrates a weak pull-down circuit for detecting shorted flying capacitors in the dual phase Dickson 4:1 converter in accordance with various embodiments of the present disclosure.

FIG. 11 illustrates a weak pull-down circuit for detecting shorted flying capacitors in the dual phase Dickson 4:1 converter in accordance with various embodiments of the present disclosure. The weak pull-down circuit comprises current references IREFA, IREFB, and switches QRA, QRB.

The weak pull-down circuit is realized through turning on the switches Q1A or Q1B with a limited current to suppress the in-rush current. Switches QRA and Q1A form a current mirror. As shown in FIG. 11, the switch QRA and IREFA can be used to limit the current flowing through Q1A during the weak turn-on of the switch Q1A. The operation principle is similar to that discussed above with respect to FIG. 2, hence is not repeated herein. Likewise, Switches QRB and Q1B form a current mirror. The switch QRB and IREFB can be used to limit the current flowing through Q1B during the weak turn-on of Q1B.

It should be noted that the weak pull-down circuit can be realized through connecting the resistors R1A and/or R1B into the circuit. The operation principle is similar to that discussed above with respect to FIG. 6, hence is not repeated herein.

Figure 12:
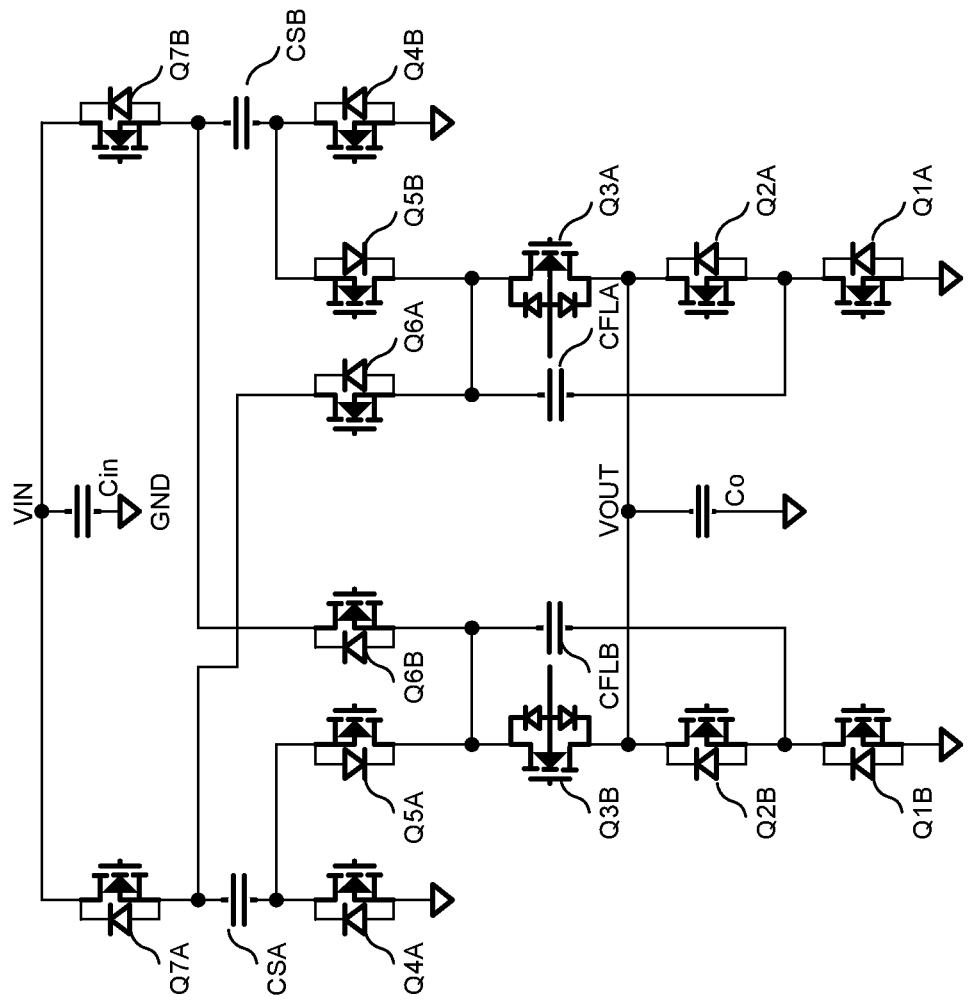
FIG. 12 illustrates a dual phase hybrid 4:1 converter in accordance with various embodiments of the present disclosure.

FIG. 12 illustrates a dual phase hybrid 4:1 converter in accordance with various embodiments of the present disclosure. A first phase comprises switches Q7A, Q6A, Q5A, Q4A, Q3A, Q2A and Q1A. Switches Q7A, Q6A, Q3A, Q2A and Q1A are connected in series between VIN and ground. A second phase comprises switches Q7B, Q6B, Q5B, Q4B, Q3B, Q2B and Q1B. Switches Q7B, Q6B, Q3B, Q2B and Q1B are connected in series between VIN and ground. The dual phase hybrid 4:1 converter further comprises flying capacitors CFLA and CFLB. The flying capacitor CFLA is connected between a common node of switches Q6A and Q3A, and a common node of switches Q2A and Q1A. The flying capacitor CFLB is connected between a common node of switches Q6B and Q3B, and the common node of switches Q2B and Q1B.

The third switch Q3A of the first phase and the third switch Q3B of the second phase are configured as body switching switches. Before the switched capacitor converter is powered on, the body terminals of switches Q3A and Q3B are connected to respective drain terminals of these two switches.

The dual phase hybrid 4:1 converter further comprises a first auxiliary grounding leg and a second auxiliary grounding leg. The first auxiliary grounding leg comprises two series-connected switches Q4A and Q5A. These two switches are connected in parallel with the lower three switches Q1B, Q2B and Q3B of the second phase. A flying capacitor CSA is connected between switches Q4A and Q7A. The second auxiliary grounding leg comprises two series-connected switches Q4B and Q5B. These two switches are connected in parallel with the lower three switches Q1A, Q2A and Q3A of the first phase. A flying capacitor CSB is connected between A first auxiliary grounding leg Q4B and Q7B. In FIG. 12, additional flying capacitors CSA, CSB and switches Q4A, Q4B, Q5A and Q5B form a switch-capacitor circuit used to boost the voltage conversion ratio.

Figure 13:
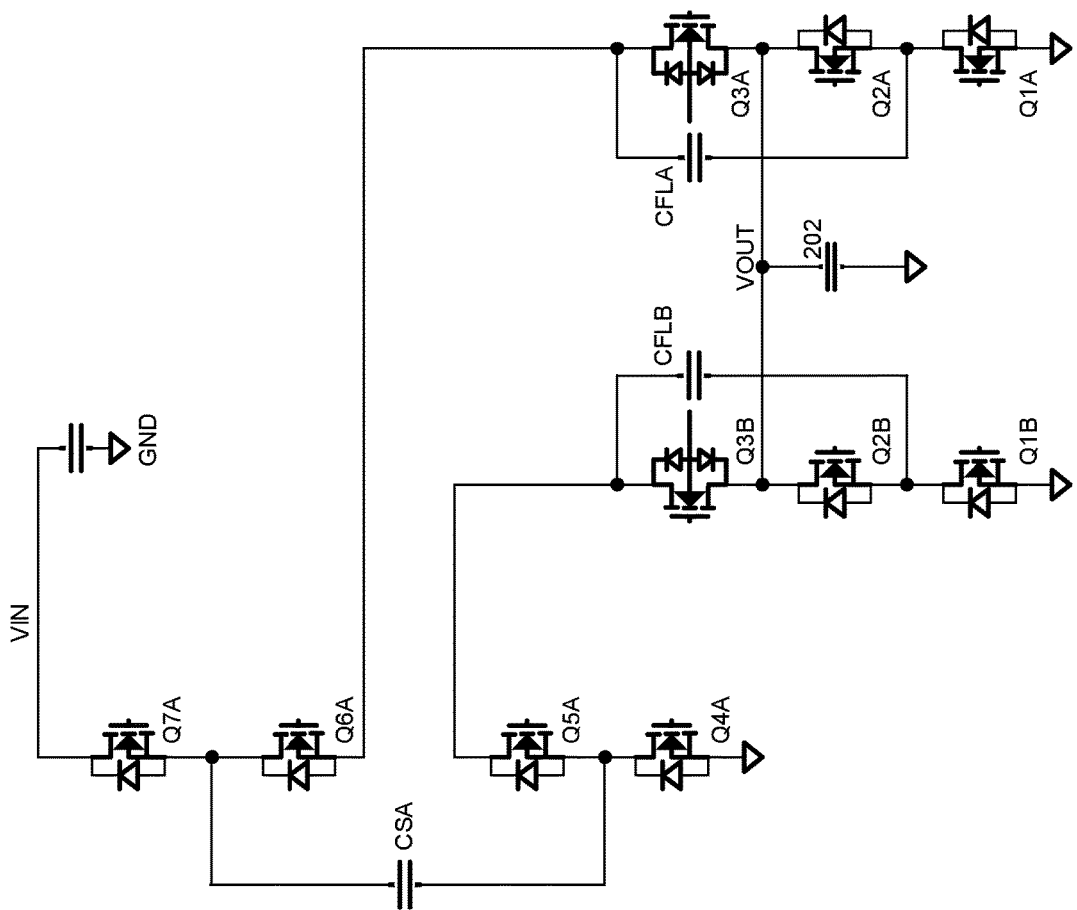
FIG. 13 illustrates a single-phase equivalent circuit of the dual phase hybrid 4:1 converter shown in FIG. 12 in accordance with various embodiments of the present disclosure.

FIG. 13 illustrates a single-phase equivalent circuit of the dual phase hybrid 4:1 converter shown in FIG. 12 in accordance with various embodiments of the present disclosure. For the purpose of describing the short circuit detection procedure, the dual phase hybrid 4:1 converter shown in FIG. 12 can be simplified to a single-phase circuit as shown in FIG. 13. Based on this single-phase equivalent circuit, the short circuit detection procedure described above is generally applicable to the two phases in a same manner.

The first phase of the dual phase hybrid 4:1 converter and three switches Q1B, Q2B and Q3B of the second phase are illustrated in FIG. 13. This single-phase equivalent circuit shown in FIG. 13 is used to describe the short circuit detection procedure of the first phase. The single-phase equivalent circuit of the second phase of the dual phase hybrid 4:1 converter is similar to that shown in FIG. 13, and hence is not shown for avoiding repetition.

Figure 14:
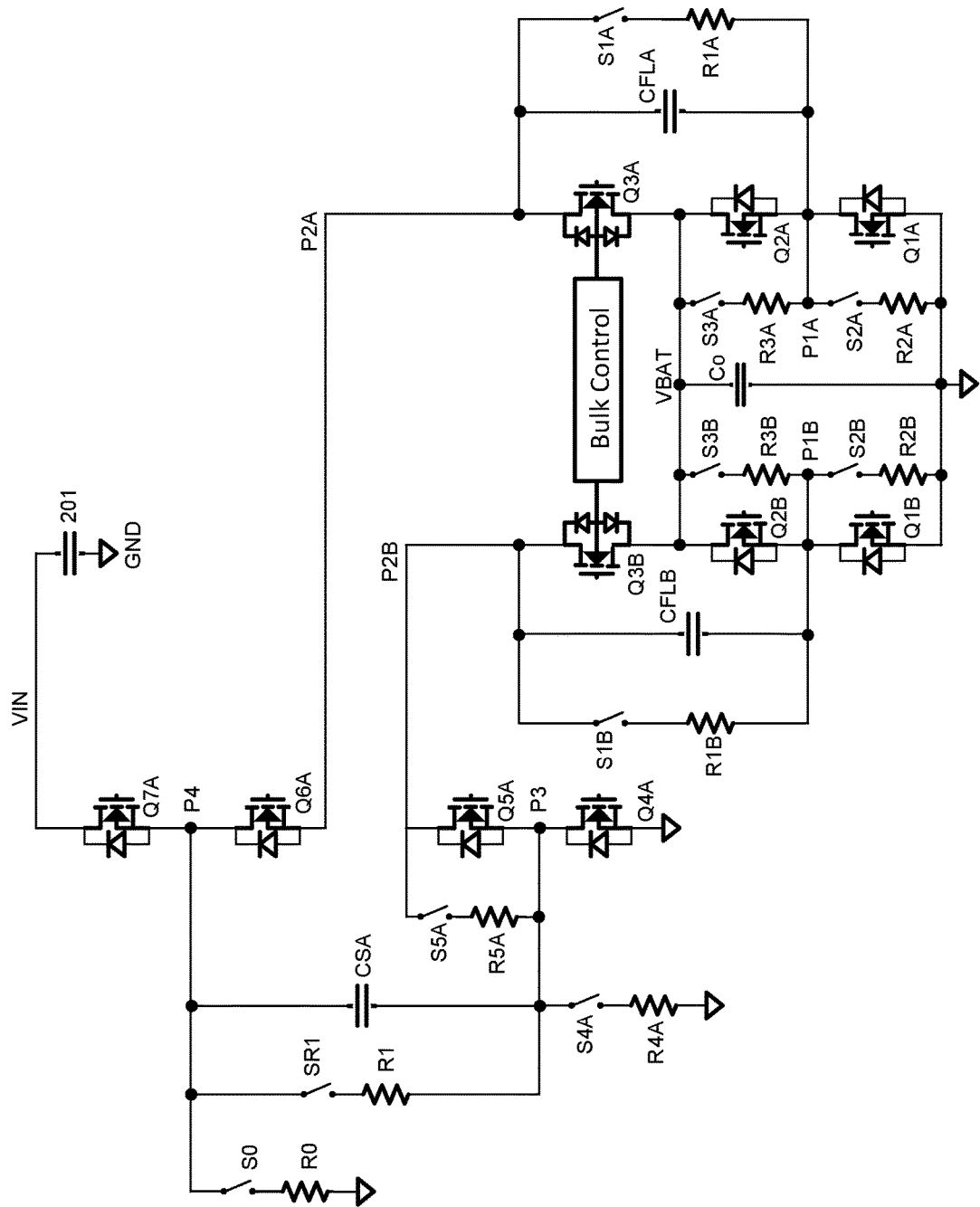
FIG. 14 illustrates a short circuit detection apparatus for detecting shorted elements in the dual phase hybrid 4:1 converter in accordance with various embodiments of the present disclosure.

FIG. 14 illustrates a short circuit detection apparatus for detecting shorted elements in the dual phase hybrid 4:1 converter in accordance with various embodiments of the present disclosure. Auxiliary circuits are introduced to assist the short circuit detection. The auxiliary circuits include resistors R1A, R2A, R3A, R4A, R5A, R1B, R2B, R3B, R0, and switches S1A, S2A, S3A, S4A, S5A, S1B, S2B, S3B, S0. The auxiliary circuits form a plurality of discharge circuits for discharging flying capacitors and critical circuit nodes.

Similar to the previous examples discussed above with respect to FIGS. 6-7, in a first step of the short circuit detection method, the short circuit detection apparatus is configured to determine whether the switches Q3A and Q3B are shorted. This is done by measuring the voltages on the nodes P2A and P2B, which are supposed to be close to zero if switches Q3A and Q3B are able to block the battery voltage connected to the source terminals of switches Q3A and Q3B. If the voltages on P2A or P2B is greater than a predetermined threshold (e.g., 0.1 V), then it indicates that Q3A or Q3B is shorted or multiple components in the circuit shown in FIG. 14 are shorted. For example, Q6A and Q7A are shorted. In these two situations, the system will be notified that a short circuit fault has been detected, and the power supplied to the circuit is halted. In this process, if the voltages on the node P4 is higher than the predetermined threshold, this indicates that a short occurs at the switch Q3A. On the other hand, if node P4 is the only node where a voltage is higher than the predetermined threshold, this indicates that the switch Q7A is shorted.

Similar to the previous examples discussed above with respect to FIGS. 6-7, in a second step of the short circuit detection method, the short circuit detection apparatus is configured to determine whether the bottom switches are shorted. The second step includes two sub-steps. In a first sub-step, resistors R2A and R2B are connected into the circuit while keeping resistors R3A and R3B disconnected from the circuit. After a predetermined period of time (e.g., 100 us), the voltages on nodes HA and P1B are measured. If switches Q2A and Q2B are able to block the voltage from the battery, the voltages on nodes P1A and P1B should be sufficiently low. If any measured voltage is greater than a predetermined threshold (e.g., 0.1 V), it indicates that the corresponding switch (Q2A or Q2B) is shorted. In a second sub-step, resistors R3A and R3B are connected into the circuit while keeping resistors R2A and R2B disconnected from the circuit. After a predetermined period of time (e.g., 100 us), the voltages on nodes P1A and P1B are measured. If the switches Q1A and Q1B are not shorted, the voltages on nodes P1A and P1B should be sufficiently high as these two nodes are charged by the battery through resistors R3A and R3B. If any measured voltage is less than a predetermined threshold (e.g., 0.3 V), it indicates that the corresponding switch (Q1A or Q1B) is shorted.

It should be noted that the above-mentioned steps do not need to be executed in this exact order, and the short circuit detection of the first switch (e.g., Q1A or Q1B) of one phase can be done at the same time as the short circuit detection of the second switch (e.g., Q2A or Q2B) of the other phase.

After the short circuit detection of the bottom three switches are completed without detecting a short circuit fault, the next step is to detect the short of the flying capacitors CFLA and CFLB. This short circuit detection is done by turning on switches Q3A and Q3B to allow the battery voltage to reach nodes P2A, P2B and P4 through switches Q3A, Q3B and the body diode of switch Q6A. Then, a weak pull-down circuit coupled to nodes P1A and P1B is enabled to connect the nodes P1A and P1B to ground with a limited current ability. After a sufficiently long time, if none of the flying capacitors is shorted, then the voltage on the nodes P1A and P1B should be sufficiently close to the ground potential. If the voltage on P1A or P1B is greater than a predetermined threshold (e.g., 0.1 V), then the corresponding flying capacitor is shorted.

Figure 15:
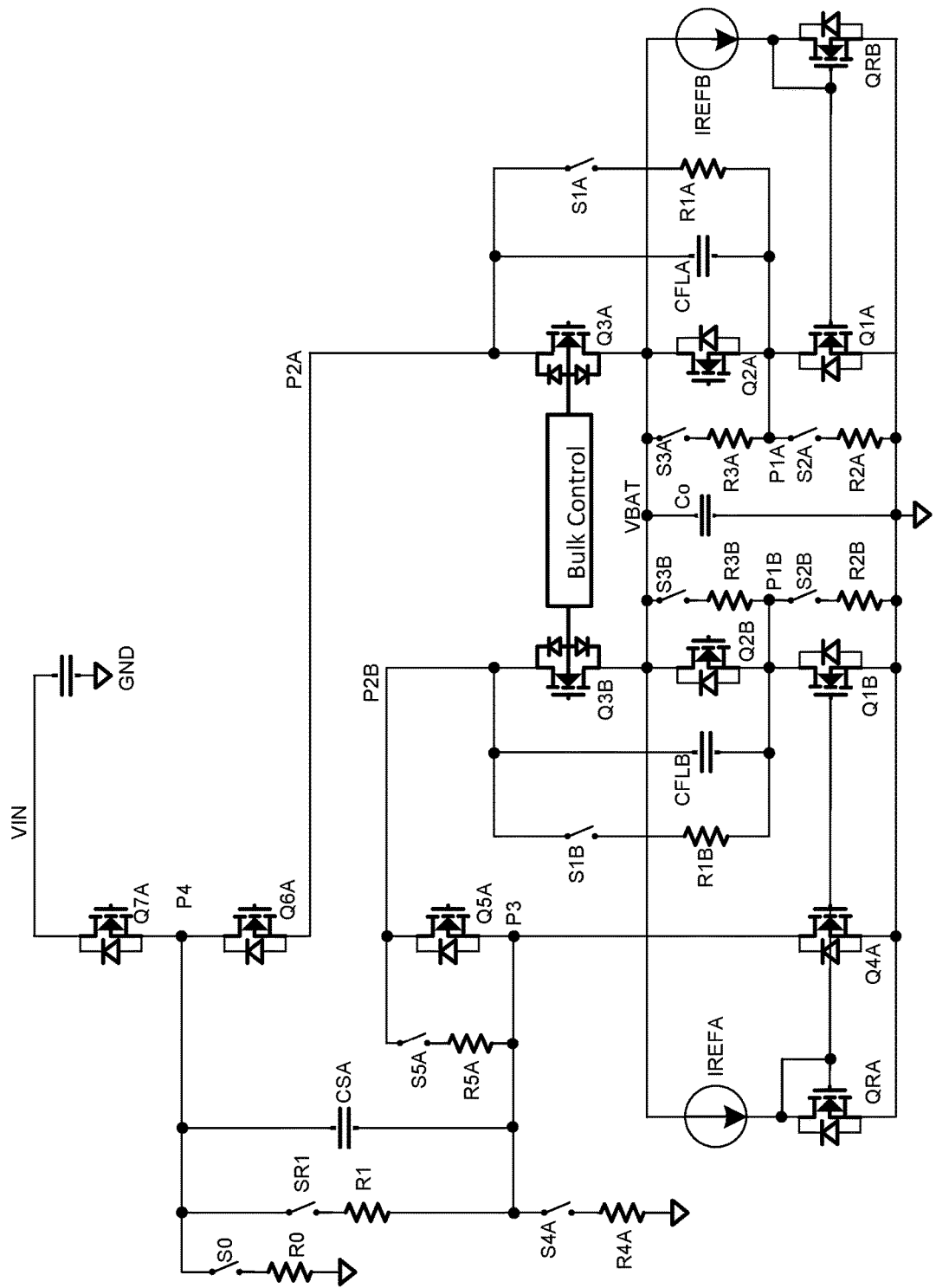
FIG. 15 illustrates a weak pull-down circuit for detecting shorted flying capacitors in the dual phase hybrid 4:1 converter in accordance with various embodiments of the present disclosure.

FIG. 15 illustrates a weak pull-down circuit for detecting shorted flying capacitors in the dual phase hybrid 4:1 converter in accordance with various embodiments of the present disclosure. The weak pull-down circuit comprises current references IREFA, IREFB, and switches QRA, QRB.

The weak pull-down circuit is realized through turning on Q1A or Q1B with a limited current to suppress the in-rush current. QRB and Q1A form a current mirror. As shown in FIG. 15, QRB and IREFB can be used to limit the current flowing through Q1A during the weak turn-on of Q1A. The operation principle is similar to that discussed above with respect to FIG. 2, hence is not repeated herein. Likewise, QRA and Q1B form a current mirror. QRA and IREFA can be used to limit the current flowing through Q1B during the weak turn-on of Q1B.

It should be noted that the weak pull-down circuit can be realized through connecting the resistors R2A and/or R2B into the circuit. The operation principle is similar to that discussed above with respect to FIG. 6, hence is not repeated herein.

After confirming the lower three switches Q1A, Q1B, Q2A, Q2B, Q3A and Q3B are not shorted, the short circuit in the grounding leg comprising switches Q5A, Q4A, and the flying capacitor CSA can be detected using the similar procedure as the short circuit detection of switches Q1B, Q2B and flying capacitor CFLB.

In the short circuit detection of switches Q1B, Q2B and flying capacitor CFLB, switch Q3B is turned on, and switch Q3A remains off. The battery voltage VBAT is applied to node P2B. The short circuit detection of switch Q5A and Q4A is done in two steps. In a first step of detecting the short circuit of switches Q5A and Q4A, R4A is connected into the circuit while keeping R5A disconnected from the circuit. After a predetermined period of time (e.g., 100 us), the voltage on node P3 is measured. If the switch Q5A is able to block the voltage from node P2B, the voltage on node P3 should be sufficiently low. If the measured voltage on node P3 is greater than a predetermined threshold (e.g., 0.1 V), it indicates that the corresponding switch Q5A is shorted.

In a second step detecting the short circuit of Q5A and Q4A, R5A is connected into the circuit while keeping R4A disconnected from the circuit. After a predetermined period of time (e.g., 100 us), the voltage on node P3 is measured. If the switch Q4A is not shorted, the voltage on node P3 should be sufficiently high as it is charged by the battery through Q3B and R5A. If the measured voltage on node P3 is less than a predetermined threshold (e.g., 0.3 V), it indicates that the corresponding switch Q4A is shorted.

Then, the short circuit detection of flying capacitor CSA can follow the similar step as used above with respect to the short circuit test of the flying capacitors CFLA and CFLB. Switch Q3A is turned on to allow node P4 to have a voltage potential about equal to VBAT. Then, a weak pull-down circuit of node P3 is enabled to connect node P3 to ground with a limited current sinking ability. After a sufficiently long time, if the flying capacitor CSA is not shorted, then the voltage on the node P3 should be sufficiently close to the ground potential. If the voltage on node P3 is greater than a predetermined threshold (e.g., 0.1 V), the flying capacitor CSA is shorted.

One of the ways to realize the weak pull-down circuit is to turn on the switch Q4A with a limited current to suppress the in-rush current. QRA and Q4A form a current mirror. As shown in FIG. 15, QRA and IREFA can be used to limit the current flowing through Q4A during this weak turn-on of Q4A. The operation principle is similar to that discussed above with respect to FIG. 2, hence is not repeated herein.

It should be noted that the weak pull-down circuit can be realized through connecting the resistor R4A into the circuit. The operation principle is similar to that discussed above with respect to FIG. 6, hence is not repeated herein.

Similarly, the other phase of the dual-phase hybrid 4:1 circuit can use the same short circuit detection procedure to ensure no switch (e.g., Q5B or Q4B) or flying capacitor (e.g., CSB) is shorted before fully turning on the circuit for power conversion operations.

Figure 16:
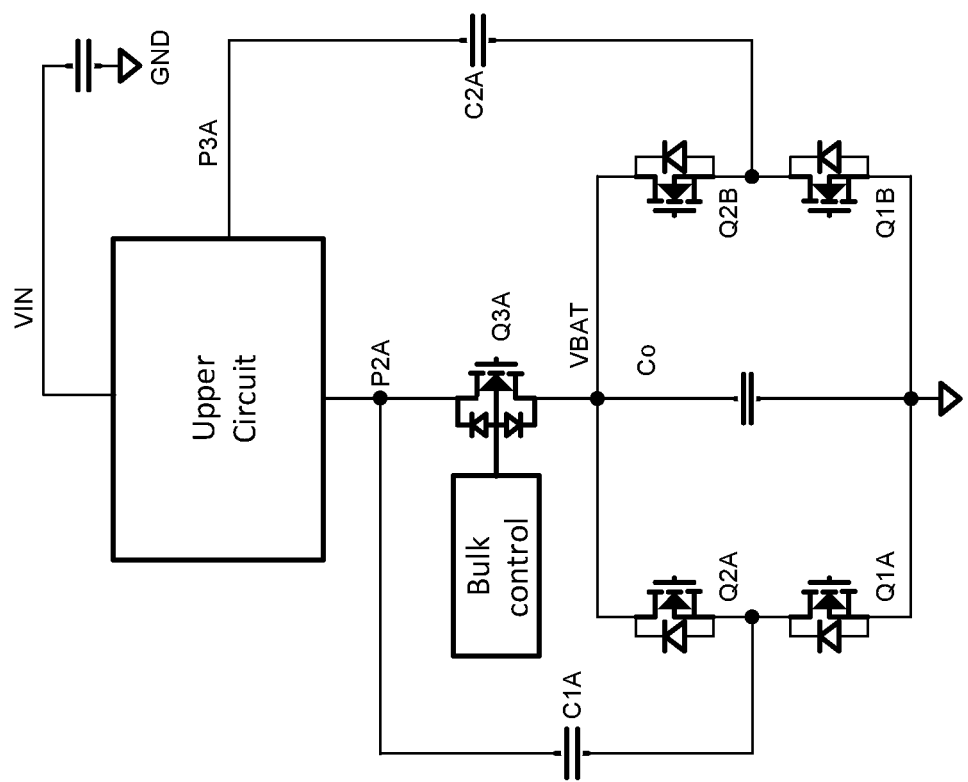
FIG. 16 illustrates a generalized model of the dual-phase switched capacitor circuit topologies in accordance with various embodiments of the present disclosure.

FIG. 16 illustrates a generalized model of the dual-phase switched capacitor circuit topologies in accordance with various embodiments of the present disclosure. All of the above dual-phase switched capacitor circuit topologies can be generalized into the circuit shown in FIG. 16. The switched capacitor circuit shown in FIG. 16 comprises a first switch Q1A, a second switch Q2A, a third switch Q3A and an upper circuit connected in series between ground and the input voltage bus VIN. Referring back to FIGS. 7, 8 and 12, the upper circuit may comprise a plurality of switches and capacitors.

The switched capacitor circuit shown in FIG. 16 further comprises a flying capacitor connected between a common node of the first switch Q1A and the second switch Q2A, and a common node of the third switch Q3A and the upper circuit. The switched capacitor converter is configured to charge a battery coupled to an output of the switched capacitor converter at the common node of the second switch Q2A and the third switch Q3A.

The short circuit detection method can be generalized to include the following steps. In a first short circuit testing step, the method includes determining whether the third switch (e.g., Q3A) is shorted by comparing a voltage on the common node of the upper circuit and the third switch with a first predetermined voltage reference. After passing the first short circuit testing step, in one sub-step of a second short circuit testing step, the method includes determining whether the first switch (e.g., Q1A) is shorted by comparing a voltage on the common node of the first switch and the second switch with a second predetermined voltage reference. In another sub-step of the second short circuit testing step, the method includes determining whether the second switch (e.g., Q2A) is shorted by comparing the voltage on the common node of the first switch and the second switch with a third predetermined voltage reference.

The switched capacitor circuit shown in FIG. 16 further comprises a fourth switch Q1B and a fifth switch Q2B connected in series between ground and the output of the switched capacitor converter, a second flying capacitor connected between a common node of the fourth switch Q1B and the fifth switch Q2B, and the upper circuit.

The short circuit detection method can be generalized to include the following steps. In a first short circuit testing step, the method includes determining whether the third switch (e.g., Q3A) is shorted by comparing a voltage on the common node of the upper circuit and the third switch with a first predetermined voltage reference. After passing the first short circuit testing step, in one sub-step of a second short circuit testing step, the method includes determining whether the first switch (e.g., Q1A) is shorted by comparing a voltage on the common node of the first switch and the second switch with a second predetermined voltage reference and determining whether the fifth switch (e.g., Q2B) is shorted by comparing a voltage on the common node of the fourth switch (e.g., Q1B) and the fifth switch with a third predetermined voltage reference. In another sub-step of the second short circuit testing step, the method includes determining whether the second switch (e.g., Q2A) is shorted by comparing the voltage on the common node of the first switch and the second switch with the third predetermined voltage reference and determining whether the fourth switch is shorted by comparing the voltage on the common node of the fourth switch and the fifth switch with the second predetermined voltage reference.

Figure 17:
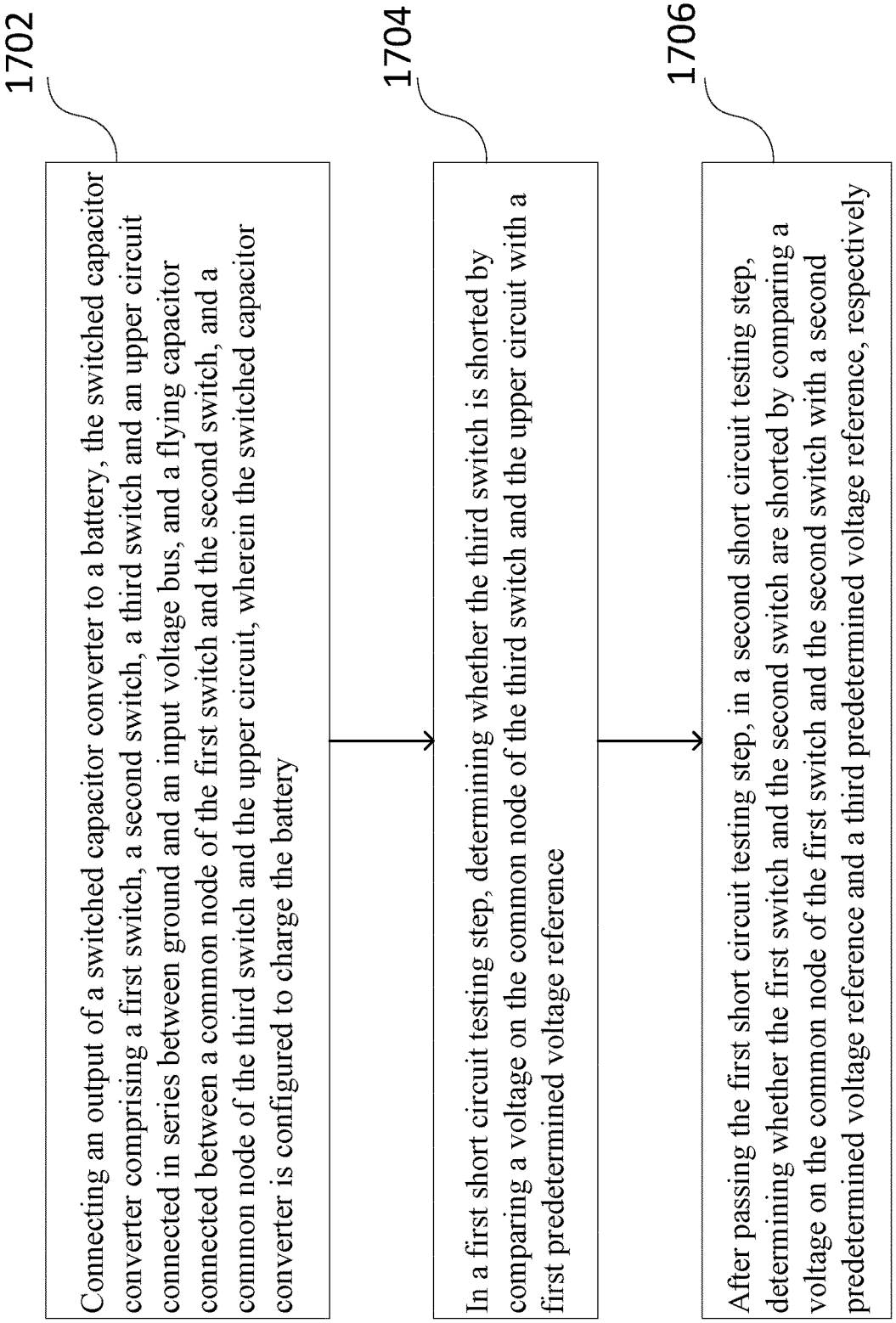
FIG. 17 illustrates a flow chart of a short circuit detection method for the switched capacitor converter shown in FIG. 16 in accordance with various embodiments of the present disclosure.

FIG. 17 illustrates a flow chart of a short circuit detection method for the switched capacitor converter shown in FIG. 16 in accordance with various embodiments of the present disclosure. This flowchart shown in FIG. 17 is merely an example, which should not unduly limit the scope of the claims. One of ordinary skill in the art would recognize many variations, alternatives, and modifications. For example, various steps illustrated in FIG. 17 may be added, removed, replaced, rearranged and repeated.

At step 1702, an output of a switched capacitor converter is connected to a battery. The switched capacitor converter comprises a first switch, a second switch, a third switch and an upper circuit connected in series between ground and an input voltage bus, and a flying capacitor connected between a common node of the first switch and the second switch, and a common node of the third switch and the upper circuit. The switched capacitor converter is configured to charge the battery.

At step 1704, in a first short circuit testing step, a control circuits determines whether the third switch is shorted by comparing a voltage on the common node of the third switch and the upper circuit with a first predetermined voltage reference.

At step 1706, after passing the first short circuit testing step, in a second short circuit testing step, the control circuit determines whether the first switch and the second switch are shorted by comparing a voltage on the common node of the first switch and the second switch with a second predetermined voltage reference and a third predetermined voltage reference, respectively.

The method further comprises after passing the second short circuit testing step, turning on the third switch, and in a third short circuit testing step, determining whether the flying capacitor is shorted by comparing the voltage on the common node of the first switch and the second switch with a fourth predetermined voltage reference.

The method further comprises discharging the voltage on the common node of the first switch and the second switch with a predetermined flying capacitor short-circuit testing current, and after a predetermined flying capacitor short-circuit testing time, comparing the voltage on the common node of the first switch and the second switch with the fourth predetermined voltage reference to determine whether the flying capacitor is shorted.

The method further comprises discharging the common node of the third switch and the upper circuit through a resistor prior to performing the first short circuit testing step, and during the first short circuit testing step, comparing the voltage on the common node of the third switch and the upper circuit with the first predetermined voltage reference to determine whether the third switch is shorted.

The method further comprises in a sub-step of the second short circuit testing step, driving a voltage across the first switch toward zero volts for a predetermined first switch testing time, charging the voltage on the common node of the first switch and the second switch with a predetermined first switch short-circuit testing current, and after a predetermined first switch short-circuit testing time, comparing the voltage on the common node of the first switch and the second switch with the second predetermined voltage reference to determine whether the first switch is shorted.

The method further comprises in another sub-step of the second short circuit testing step, driving a voltage across the first switch toward zero volts for a predetermined second switch testing time with a predetermined second switch testing current, and comparing the voltage on the common node of the first switch and the second switch with the third predetermined voltage reference to determine whether the second switch is shorted.

The switched capacitor circuit further comprises a fourth switch (e.g., Q1B shown in FIG. 16) and a fifth switch (e.g., Q2B shown in FIG. 16) connected in series between ground and the output of the switched capacitor converter, a second flying capacitor connected between a common node of the fourth switch and the fifth switch, and the upper circuit.

The method further comprises in a sub-step of the second short circuit testing step, simultaneously charging the voltage on the common node of the first switch and the second switch with a predetermined first switch short-circuit testing current, and discharging a voltage on the common node of the fourth switch and the fifth switch toward zero volt with a predetermined fifth switch short-circuit testing current, and after a predetermined first switch short-circuit testing time, comparing the voltage on the common node of the first switch and the second switch with the second predetermined voltage reference to determine whether the first switch is shorted, and comparing the voltage on the common node of the fourth switch and the fifth switch with the third predetermined voltage reference to determine whether the fifth switch is shorted.

The method further comprises in another sub-step of the second short circuit testing step, simultaneously driving a voltage across the first switch toward zero volts with a predetermined second switch testing current, and charging a voltage on the common node of the fourth switch and the fifth switch with a predetermined fourth switch short-circuit testing current, and after a predetermined second switch short-circuit testing time, comparing the voltage on the common node of the first switch and the second switch with the third predetermined voltage reference to determine whether the second switch is shorted, and comparing the voltage on the common node of the fourth switch and the fifth switch with the second predetermined voltage reference to determine whether the fourth switch is shorted.

In some embodiments, the third switch comprises a first diode connected between a drain and a bulk terminal of the third switch, and a second diode connected between a source and the bulk terminal of the third switch, and wherein the first diode and the second diode are back-to-back connected, and wherein characteristics of a channel of the third switch are controlled through adjusting a voltage potential at the bulk terminal of the third switch.

In some embodiments, the upper circuit comprises a plurality of switches and capacitors.

In accordance with an embodiment, a method comprises connecting an output of a switched capacitor converter to a battery, the switched capacitor converter comprising a first switch, a second switch, a third switch and an upper circuit connected in series between ground and an input voltage bus, and a flying capacitor connected between a common node of the first switch and the second switch, and a common node of the third switch and the upper circuit, wherein the switched capacitor converter is configured to charge the battery, in a first short circuit testing step, determining whether the third switch is shorted by comparing a voltage on the common node of the third switch and the upper circuit with a first predetermined voltage reference, and after passing the first short circuit testing step, in a second short circuit testing step, determining whether the first switch and the second switch are shorted by comparing a voltage on the common node of the first switch and the second switch with a second predetermined voltage reference and a third predetermined voltage reference, respectively.

In accordance with another embodiment, a method for detecting failed components in a switched capacitor converter comprising three switches, a flying capacitor and an upper circuit, the method comprises in a first step, comparing a voltage on a common node of a third switch and the upper circuit with a first predetermined voltage reference to determine whether the third switch of the switched capacitor converter is shorted, wherein the third switch is connected in series with a first switch and a second switch on one side, and the upper circuit on the other side between ground and a power source, after passing the first step, in a sub-step of a second step, comparing a voltage on a common node of the first switch and the second switch with a second predetermined voltage reference to determine whether the first switch is shorted, after passing the first step, in another sub-step of the second step, comparing the voltage on the common node of the first switch and the second switch with a third predetermined voltage reference determining whether the second switch is shorted, and after passing the second step, turning on the third switch, and in a third step, comparing the voltage on the common node of the first switch and the second switch with a fourth predetermined voltage reference to determine whether the flying capacitor is shorted.

In accordance with yet another embodiment, a system comprises a switched capacitor converter comprising a first switch, a second switch, a third switch and an upper circuit connected in series between ground and an input voltage bus, and a flying capacitor connected between a common node of the first switch and the second switch, and a common node of the third switch and the upper circuit, wherein the switched capacitor converter is configured to charge a battery coupled to an output terminal of the switched capacitor converter, and wherein the output terminal is at a common node of the second switch and the third switch, and a short circuit detection apparatus comprising a first dedicated circuit, wherein the first dedicated circuit comprises a first control switch and a first resistor connected in series between the common node of the second switch and the first switch, and the output terminal, and wherein the first dedicated circuit is configured to establish a voltage on the common node of the first switch and the second switch to conduct a short circuit test.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
connecting an output of a switched capacitor converter to a battery, the switched capacitor converter comprising a first switch, a second switch, a third switch and an upper circuit connected in series between ground and an input voltage bus, and a flying capacitor connected between a common node of the first switch and the second switch, and a common node of the third switch and the upper circuit, wherein the switched capacitor converter is configured to charge the battery;
in a first short circuit testing step, determining whether the third switch is shorted by comparing a voltage on the common node of the third switch and the upper circuit with a first predetermined voltage reference; and
after passing the first short circuit testing step, in a second short circuit testing step, determining whether the first switch and the second switch are shorted by comparing a voltage on the common node of the first switch and the second switch with a second predetermined voltage reference and a third predetermined voltage reference, respectively.

2. The method of claim 1, further comprising:
after passing the second short circuit testing step, turning on the third switch; and
in a third short circuit testing step, determining whether the flying capacitor is shorted by comparing the voltage on the common node of the first switch and the second switch with a fourth predetermined voltage reference.

3. The method of claim 2, further comprising:
discharging the voltage on the common node of the first switch and the second switch with a predetermined flying capacitor short-circuit testing current; and
after a predetermined flying capacitor short-circuit testing time, comparing the voltage on the common node of the first switch and the second switch with the fourth predetermined voltage reference to determine whether the flying capacitor is shorted.

4. The method of claim 1, further comprising:
discharging the common node of the third switch and the upper circuit through a resistor prior to performing the first short circuit testing step; and
during the first short circuit testing step, comparing the voltage on the common node of the third switch and the upper circuit with the first predetermined voltage reference to determine whether the third switch is shorted.

5. The method of claim 1, further comprising:
in a sub-step of the second short circuit testing step, driving a voltage across the first switch toward zero volts for a predetermined first switch testing time;
charging the voltage on the common node of the first switch and the second switch with a predetermined first switch short-circuit testing current; and
after a predetermined first switch short-circuit testing time, comparing the voltage on the common node of the first switch and the second switch with the second predetermined voltage reference to determine whether the first switch is shorted.

6. The method of claim 1, further comprising:
in another sub-step of the second short circuit testing step, driving a voltage across the first switch toward zero volts for a predetermined second switch testing time with a predetermined second switch testing current; and
comparing the voltage on the common node of the first switch and the second switch with the third predetermined voltage reference to determine whether the second switch is shorted.

7. The method of claim 1, wherein:
the third switch comprises a first diode connected between a drain and a bulk terminal of the third switch, and a second diode connected between a source and the bulk terminal of the third switch, and wherein the first diode and the second diode are back-to-back connected, and wherein characteristics of a channel of the third switch are controlled through adjusting a voltage potential at the bulk terminal of the third switch; and
the upper circuit comprises a plurality of switches and capacitors.

8. The method of claim 1, wherein:
the flying capacitor is a first flying capacitor; and
the switched capacitor converter further comprises a fourth switch and a fifth switch connected in series between ground and the common node of the second switch and the third switch, and a second flying capacitor connected between a common node of the fourth switch and the fifth switch, and the upper circuit.

9. The method of claim 8, further comprising:
in a sub-step of the second short circuit testing step, simultaneously charging the voltage on the common node of the first switch and the second switch with a predetermined first switch short-circuit testing current, and discharging a voltage on the common node of the fourth switch and the fifth switch with a predetermined fifth switch short-circuit testing current; and
after a predetermined first switch short-circuit testing time, comparing the voltage on the common node of the first switch and the second switch with the second predetermined voltage reference to determine whether the first switch is shorted, and comparing the voltage on the common node of the fourth switch and the fifth switch with the third predetermined voltage reference to determine whether the fifth switch is shorted.

10. The method of claim 8, further comprising:
in another sub-step of the second short circuit testing step, simultaneously driving a voltage across the first switch toward zero volts with a predetermined second switch testing current, and charging a voltage on the common node of the fourth switch and the fifth switch with a predetermined fourth switch short-circuit testing current; and after a predetermined second switch short-circuit testing time, comparing the voltage on the common node of the first switch and the second switch with the third predetermined voltage reference to determine whether the second switch is shorted, comparing the voltage on the common node of the fourth switch and the fifth switch with the second predetermined voltage reference to determine whether the fourth switch is shorted.

11. A method for detecting failed components in a switched capacitor converter comprising three switches, a flying capacitor and an upper circuit, the method comprising:

in a first step, comparing a voltage on a common node of a third switch and the upper circuit with a first predetermined voltage reference to determine whether the third switch of the switched capacitor converter is shorted, wherein the third switch is connected in series with a first switch and a second switch on one side, and the upper circuit on the other side between ground and a power source;

after passing the first step, in a sub-step of a second step, comparing a voltage on a common node of the first switch and the second switch with a second predetermined voltage reference to determine whether the first switch is shorted;

after passing the first step, in another sub-step of the second step, comparing the voltage on the common node of the first switch and the second switch with a third predetermined voltage reference to determine whether the second switch is shorted; and after passing the second step, turning on the third switch, and in a third step, comparing the voltage on the common node of the first switch and the second switch with a fourth predetermined voltage reference to determine whether the flying capacitor is shorted.

12. The method of claim 11, wherein the switched capacitor converter comprises:

the first switch, the second switch, the third switch and the upper circuit connected in series between ground and an input voltage bus; and the flying capacitor connected between the common node of the first switch and the second switch, and the common node of the third switch and the upper circuit.

13. The method of claim 11, further comprising:
discharging the common node of the third switch and the upper circuit through a resistor to ground prior to performing the first step; and
in the first step, determining that the third switch is not shorted when the voltage on the common node of the third switch and the upper circuit is lower than the first predetermined voltage reference.

14. The method of claim 11, further comprising:
in the second step, driving a voltage across the first switch toward zero volts for a predetermined first switch testing time;
charging the voltage on the common node of the first switch and the second switch with a predetermined first switch short-circuit testing current; and
after a predetermined first switch short-circuit testing time, determining that the first switch is not shorted when the voltage on the common node of the first switch and the second switch is higher than the second predetermined voltage reference.

15. The method of claim 11, further comprising:
in the second step, driving a voltage across the first switch toward zero volts for a predetermined second switch testing time with a predetermined second switch testing current; and
determining that the second switch is shorted when the voltage on the common node of the first switch and the second switch is higher than the third predetermined voltage reference.

16. A system comprising:
a switched capacitor converter comprising a first switch, a second switch, a third switch and an upper circuit connected in series between ground and an input voltage bus, and a flying capacitor connected between a common node of the first switch and the second switch, and a common node of the third switch and the upper circuit, wherein the switched capacitor converter is configured to charge a battery coupled to an output terminal of the switched capacitor converter, and wherein the output terminal is at a common node of the second switch and the third switch; and a short circuit detection apparatus comprising a first dedicated circuit, wherein the first dedicated circuit comprises a first control switch and a first resistor connected in series between the common node of the second switch and the first switch, and the output terminal, and wherein the first dedicated circuit is configured to establish a voltage on the common node of the first switch and the second switch to conduct a short circuit test.

17. The system of claim 16, wherein:
the common node of the third switch and the upper circuit is discharged using a resistor and a switch coupled between the common node of the third switch and the upper circuit, and ground prior to performing the first step of the short circuit test; and
in a first step of the short circuit test, the third switch is determined to be not shorted when a voltage on the common node of the third switch and the upper circuit is lower than a first predetermined voltage reference.

18. The system of claim 16, further comprising:
a third dedicated circuit comprising a third resistor and a third control switch connected in series between the common node of the first switch and the second switch, and ground.

19. The system of claim 18, wherein:
in a second step of the short circuit test, a voltage across the first switch is driven toward zero volts using the third dedicated circuit;
the first dedicated circuit is configured to establish the voltage on the common node of the first switch and the second switch; and
the first switch is determined to be not shorted when the voltage on the common node of the first switch and the second switch is higher than a second predetermined voltage reference.

20. The system of claim 18, wherein:
in a second step of the short circuit test, a voltage across the first switch is driven toward zero volts using the third dedicated circuit; and
the second switch is determined to be shorted when the voltage on the common node of the first switch and the second switch is higher than a third predetermined voltage reference.

* * * * *